US012693824B2

(12) United States Patent
Jiang

(10) Patent No.: US 12,693,824 B2
(45) Date of Patent: Jul. 28, 2026

(54) DISPLAY METHOD, CHIP, AND ELECTRONIC DEVICE

(71) Applicant: Huawei Technologies Co., Ltd., Shenzhen (CN)

(72) Inventor: Chendi Jiang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/682,298

(22) PCT Filed: Aug. 16, 2022

(86) PCT No.: PCT/CN2022/112818
§ 371 (c)(1),
(2) Date: Feb. 8, 2024

(87) PCT Pub. No.: WO2023/020496
PCT Pub. Date: Feb. 23, 2023

(65) Prior Publication Data
US 2024/0354041 A1 Oct. 24, 2024

(30) Foreign Application Priority Data

Aug. 17, 2021 (CN) ........................ 202110940924.X

(51) Int. Cl.
*G06F 3/14* (2006.01)
(52) U.S. Cl.
CPC .................................. *G06F 3/1423* (2013.01)
(58) Field of Classification Search
None
See application file for complete search history.

(56) References Cited

U.S. PATENT DOCUMENTS

| | | | | | |
|---|---|---|---|---|---|
| 11,006,051 | B2 * | 5/2021 | Chang | ................... | H04N 5/268 |
| 2011/0090400 | A1 | 4/2011 | Huang | | |
| 2013/0328878 | A1 * | 12/2013 | Stahl | ...................... | G09G 5/005 |
| | | | | | 345/1.3 |
| 2014/0215098 | A1 | 7/2014 | Brabenac | | |
| 2016/0210769 | A1 * | 7/2016 | Suryanarayana | ......... | G06T 3/40 |
| 2016/0350063 | A1 * | 12/2016 | Chen | ..................... | G06F 3/1423 |

(Continued)

FOREIGN PATENT DOCUMENTS

CN 104598187 A 5/2015

*Primary Examiner* — Andre L Matthews
(74) *Attorney, Agent, or Firm* — Slater Matsil, LLP

(57) ABSTRACT

A first electronic device detects that a second electronic device is connected. The first electronic device determines a display mode of the first electronic device based on first information of the first electronic device and/or second information of the second electronic device, where the first/second information includes running status information and/or device information of the first/second electronic device, the display mode of the first electronic device includes: a first display mode and a second display mode, the first display mode means that the first electronic device displays display information of the second electronic device, and the second display mode means that the first electronic device displays only local display information. If the first electronic device determines that the display mode of the first electronic device includes the first display mode, the first electronic device displays the display information of the second electronic device.

20 Claims, 15 Drawing Sheets

(56)     References Cited

U.S. PATENT DOCUMENTS

| | | | |
|---|---|---|---|
| 2017/0322763 A1* | 11/2017 | Zhao | G06F 3/1423 |
| 2020/0365116 A1* | 11/2020 | Huang | G09G 5/005 |
| 2020/0379934 A1* | 12/2020 | Hsieh | G06F 13/387 |
| 2021/0056877 A1* | 2/2021 | Chew | F16M 11/2021 |
| 2023/0153257 A1* | 5/2023 | Chang | G06F 1/1601 |
| | | | 710/104 |

* cited by examiner

Back

HDMI input
port

HDMI output
port

DP output port

Type-C output
port

Power interface

USB interface

Power button

Headset jack

Network interface

Mode switching
button

Electronic device 100

DISPLAY METHOD, CHIP, AND ELECTRONIC DEVICE

CROSS-REFERENCE TO RELATED APPLICATIONS

This application is a national stage of International Application No. PCT/CN2022/112818, filed on Aug. 16, 2022, which claims priority to Chinese Patent Application No. 202110940924.X, filed on Aug. 17, 2021. Both of the aforementioned applications are hereby incorporated by reference in their entireties.

TECHNICAL FIELD

This application relates to the field of electronic technologies, and in particular, to a display method, a chip, and an electronic device.

BACKGROUND

In current fast-paced society, people often need to use laptop computers, tablet computers, and the like for mobile office, entertainment, and the like. Especially, when returning home, people often use the laptop computers, the tablet computers, and the like to continue working. However, these devices have small screens, and work efficiency is not high. One solution is to project a small-screen device such as a laptop computer or a tablet computer to a large-screen device for display. An all-in-one computer is a large-screen device frequently selected by a user, and the user displays an interface of a laptop computer through the all-in-one computer, to improve interaction experience.

If the user intends to display the interface of the laptop computer through the all-in-one computer, a general operation procedure includes: The user finds a high-definition multimedia interface (High-Definition Multimedia Interface, HDMI) on the all-in-one computer, connects the laptop computer to the HDMI input port in a wired manner, finds a mode switching button on the all-in-one computer, and triggers the mode switching button, so that the all-in-one computer switches from an all-in-one computer mode (displaying local information of the all-in-one computer) to a monitor mode (displaying information about an external device). In this process, the user needs to find the HDMI input port and the mode switching button from a plurality of interfaces in the all-in-one computer, which is cumbersome and difficult (because a common user cannot easily and accurately distinguish the HDMI input port and the mode switching button from the plurality of interfaces), and affects user experience.

In addition, when the user controls the all-in-one computer to enter the monitor mode through the mode switching button, the all-in-one computer does not display the local information. In this case, if no external device (such as a laptop computer) is connected, a screen of the all-in-one computer is black; and if an external device is connected, information about the external device is displayed. In other words, in the monitor mode, regardless of whether the all-in-one computer is connected to the external device or whether the information about the external device can be normally displayed on the all-in-one computer, the all-in-one computer is configured to display the information about the external device, and does not switch back to the all-in-one computer mode, and the all-in-one computer does not display the local information until the user controls the all-in-one computer to switch back to the all-in-one computer mode through the mode switching button. It is clear that this manner is not intelligent enough, and affects user experience.

SUMMARY

Embodiments of this application provide a display method, a chip, and an electronic device, to help improve user experience generated when information about an external device is displayed through an all-in-one computer.

According to a first aspect, a display method is provided. The method is applied to a first electronic device, and includes: detecting that the first electronic device is connected to a second electronic device; determining a display mode of the first electronic device based on first information of the first electronic device and/or second information of the second electronic device, where the first information includes running status information and/or device information of the first electronic device, the second information includes running status information and/or device information of the second electronic device, the display mode of the first electronic device includes: a first display mode and a second display mode, the first display mode means that the first electronic device displays information of the second electronic device, and the second display mode means that the first electronic device displays only local display information; and if the first electronic device determines that the display mode of the first electronic device includes the first display mode, displaying, by the first electronic device, the display information of the second electronic device.

An example in which the first electronic device is an all-in-one computer and the second electronic device is a laptop computer is used. The all-in-one computer may determine a display mode of the all-in-one computer based on first information of the all-in-one computer and/or second information of the laptop computer. When the display mode is the first display mode, the all-in-one computer displays local information. When the display mode is the second display mode, the all-in-one computer displays display information of the laptop computer. In this manner, the all-in-one computer does not serve as a monitor of the external device to passively display information of an external device, but determines, based on the first information and/or the second information, to display the display information of the external device or the local display information, which is intelligent. In addition, a mode switching button may not need to be provided on the all-in-one computer because the all-in-one computer may independently determine the display mode. In this way, a quantity of buttons on the all-in-one computer is small, and an appearance of the all-in-one computer is neat.

In a possible design, the method further includes: If the first electronic device determines that the display mode of the first electronic device includes the second display mode, the first electronic device displays the local display information. That is, the first electronic device may determine, based on the first information and/or the second information, to display the display information of the external device or the local display information, which is intelligent.

In a possible design, the first display mode includes: The first electronic device displays the display information of the second electronic device in full screen; or the first electronic device displays the display information of the second electronic device in a first area, and displays the display information of the first electronic device in a second area; or the display information of the second electronic device is located at an upper layer of the display information of the first electronic device, and partially covers the display information of the first electronic device. In other words, the first electronic device displays the display information of the external device (namely, the second electronic device) in a flexible manner, and may display the display information in full screen, in a partial area, or the like. If the display information of the external device is displayed in the partial area and the local display information is displayed in a partial area, a user can view both the local display information and the display information of the external device, and experience is good.

In a possible design, the running status information of the first electronic device includes: at least one of a power-on state, a power-off state, a display status, a first running mode, and a second running mode of the first electronic device, where the first running mode means that the first electronic device is configured to display information about an external device, and the second running mode means that the first electronic device is configured to display the local information. That is, the first electronic device may determine the display mode based on the running status information of the first electronic device, which is intelligent, and the determined display mode is accurate.

In a possible design, the device information of the first electronic device includes: at least one of a device form, a supported transmission protocol, a software system type, a software system version, a hardware version, a hardware type, and a hardware parameter of the first electronic device, where the hardware parameter includes a video format supported by a display and/or interface configuration information. That is, the first electronic device may determine the display mode based on the device information of the first electronic device, which is intelligent, and the determined display mode is accurate. It should be noted that the foregoing device information is merely an example, and may further include another type of device information. This is not limited in embodiments of this application.

In a possible design, the running status information of the second electronic device includes: at least one of a power-on state, a power-off state, a display status, a third running mode, and a fourth running mode of the second electronic device, where the third running mode means that the second electronic device is configured, so that an external device displays the display information of the second electronic device, and the fourth running mode means that the second electronic device is configured to display the display information of the second electronic device locally. That is, the first electronic device may determine the display mode of the first electronic device based on a running status of the external device. In this manner, the determined display mode is accurate.

In a possible design, the device information of the second electronic device includes: at least one of a supported transmission protocol, a software system type, a software system version, a hardware version, a hardware type, and a hardware parameter of the second electronic device, where the hardware parameter includes a video format supported by a display and/or interface configuration information. That is, the first electronic device may determine the display mode of the first electronic device based on device information of the external device. In this manner, the determined display mode is accurate.

In a possible design, the determining a display mode of the first electronic device based on first information of the first electronic device and/or second information of the second electronic device includes: when determining, based on the first information and/or the second information, that at least one of the following cases is met, determining that the display mode of the first electronic device includes the first display mode, where the cases include:

an interface that is on the first electronic device and that is connected to the second electronic device is configured to be in a first state, where the first state is a state of inputting display information of an external device into the first electronic device;

an interface that is on the second electronic device and that is connected to the first electronic device is configured to be in a second state, where the second state is a state of outputting the display information of the second electronic device to an external device;

a signal loss rate generated during signal transmission between the first electronic device and the second electronic device is less than a threshold;

a format of the display information of the first electronic device matches that of the display information of the second electronic device; and software and/or hardware of the first electronic device match/matches software and/or hardware of the second electronic device.

In this manner, when determining that the foregoing condition is met, the first electronic device enters the first display mode, that is, displays the display information of the second electronic device; when determining that the foregoing condition is not met, the first electronic device displays the local display information. In this way, a case in which a screen of the first electronic device is black because the display information of the second electronic device cannot be displayed (for example, due to a format mismatch or a software mismatch) can be avoided.

In a possible design, the determining a display mode of the first electronic device based on first information of the first electronic device and/or second information of the second electronic device includes: when determining, based on the first information, that the first electronic device is in at least one of the power-on state, a display screen-on state, and the first running mode, determining that the display mode of the first electronic device includes the first display mode, where the first running mode is a mode in which the first electronic device is configured to display information of an external device; and/or when determining, based on the second information, that the second electronic device is in at least one of the power-on state, a display screen-on state, and the third running mode, determining that the display mode of the first electronic device includes the first display mode, where the third running mode is a mode in which the second electronic device is configured, so that an external device performs displaying. In this manner, the first electronic device enters the first display mode only when the first electronic device in a current state can display the display information of the second electronic device, to avoid a case in which the screen of the first electronic device is black because the first electronic device in the current state (for example, in the second running mode) cannot display the display information of the second electronic device.

In a possible design, the determining a display mode of the first electronic device based on first information of the first electronic device and/or second information of the second electronic device includes: when determining, based on the device information of the second electronic device, that the second electronic device is a video source, determining that the display mode of the first electronic device includes the first display mode.

For example, the determining, based on the device information of the second electronic device, that the second electronic device is a video source includes: when determining, based on the device information of the second electronic device, that the second electronic device meets at least one of the following conditions: the second electronic device has a display, and a supported protocol is a source protocol, determining that the second electronic device is the video source.

In a possible design, the method further includes: The first electronic device receives an input operation of a third electronic device for the first electronic device; and the first electronic device sends information about the input operation to the second electronic device for response.

It should be noted that, for example, the first electronic device is an all-in-one computer. In a conventional technology, when the all-in-one computer displays display information of an external device, the all-in-one computer cannot respond to an operation of a mouse, a keyboard, or the like because the all-in-one computer is used as a monitor of the external device. In embodiments of this application, when the all-in-one computer displays the display information of the external device, the mouse, the keyboard, or the like of the all-in-one computer may control the all-in-one computer, and operation information of the mouse, the keyboard, or the like on the all-in-one computer is returned to the external device for response. It may be understood that if the external device updates the display information of the external device in response to such an operation, correspondingly, the display information of the external device on the all-in-one computer may also be updated.

In a possible design, after the detecting that the first electronic device is connected to a second electronic device, the method further includes: The first electronic device outputs prompt information, where the prompt information is used to prompt a user to set the first running mode, where the first running mode is a mode in which the first electronic device is configured to display information about an external device; and in response to a user operation, the first electronic device switches from the current second running mode to the first running mode, where the second running mode is a mode in which the first electronic device is configured to display the local information.

For example, the first electronic device is an all-in-one computer. When detecting that an external device is connected, the all-in-one computer may prompt a user to set the first running mode (namely, a monitor mode). In this way, a mode switching button may not need to be disposed on the all-in-one computer, to ensure that an appearance of the all-in-one computer is neat. The user also does not need to find the mode switching button from a plurality of interfaces or buttons on the back of the all-in-one computer to perform mode switching. Therefore, user experience is high by using the solution provided in embodiments of this application.

In a possible design, the first electronic device includes at least one interface configured to connect to the external device, and the detecting that the first electronic device is connected to a second electronic device includes: detecting that a first interface on the first electronic device is connected to the second electronic device, where the first interface is any interface of the interface configured to connect to an external device.

For example, the first electronic device is an all-in-one computer. A plurality of interfaces configured to connect to an external device may be disposed on the all-in-one computer, and a user may blindly select an interface and connect the interface to the external device. When detecting that the interface is connected to the external device, the all-in-one computer determines a display mode of the all-in-one computer based on the first information and/or the second information. Therefore, the user does not need to find a specific interface among the plurality of interfaces of the all-in-one computer, and has good experience.

In a possible design, when the first electronic device includes at least two interfaces configured to connect to the external device, the at least two interfaces are of a same interface type.

For example, the first electronic device is an all-in-one device. If interface types of a plurality of interfaces that are configured to connect to an external device and that are on the all-in-one computer are set to be the same, appearance consistency and neatness can be ensured, and a user can perform blind interface selection, and has good experience.

For example, the at least two interfaces are all Type-C interfaces. It may be understood that the interfaces may alternatively be interfaces of a type other than the Type-C interfaces. This is not limited in embodiments of this application.

According to a second aspect, a chip is provided, used in a first electronic device, where the chip includes:

at least one controller, configured to connect a display and a first interface that are of the first electronic device, where the first interface is configured to connect to a second electronic device;

the at least one controller is configured to determine a display mode of the first electronic device based on first information of the first electronic device and/or second information of the second electronic device, where the display mode of the first electronic device includes: a first display mode and a second display mode, the first display mode means that the first electronic device displays display information of the second electronic device, and the second display mode means that the first electronic device displays only local display information; and the first information includes running status information and/or device information of the first electronic device, and the second information includes running status information and/or device information of the second electronic device; and the at least one controller is further configured to: when determining that the display mode of the first electronic device includes the first display mode, control the display of the first electronic device to display the display information of the second electronic device.

In a possible design, the at least one controller is further configured to: when determining that the display mode of the first electronic device includes the second display mode, control the display of the first electronic device to display the display information of the first electronic device.

In a possible design, the first display mode includes: The first electronic device displays the display information of the second electronic device in full screen; or the first electronic device displays the display information of the second electronic device in a first area, and displays the display information of the first electronic device in a second area; or the display information of the second electronic device is located at an upper layer of the display information of the first electronic device, and partially covers the display information of the first electronic device.

In a possible design, the running status information of the first electronic device includes: at least one of a power-on state, a power-off state, a display status, a first running mode, and a second running mode of the first electronic device, where the first running mode means that the first electronic device is configured to display information about an external device, and the second running mode means that the first electronic device is configured to display the local information.

In a possible design, the device information of the first electronic device includes: at least one of a device form, a supported transmission protocol, a software system type, a software system version, a hardware version, a hardware type, and a hardware parameter of the first electronic device, where the hardware parameter includes a video format supported by a display and/or interface configuration information.

In a possible design, the running status information of the second electronic device includes: at least one of a power-on state, a power-off state, a display status, a third running mode, and a fourth running mode of the second electronic device, where the third running mode means that the second electronic device is configured, so that an external device displays the display information of the second electronic device, and the fourth running mode means that the second electronic device is configured to display the display information of the second electronic device locally.

In a possible design, the device information of the second electronic device includes: at least one of a supported transmission protocol, a software system type, a software system version, a hardware version, a hardware type, and a hardware parameter of the second electronic device, where the hardware parameter includes a video format supported by a display and/or interface configuration information.

In a possible design, the at least one controller includes a first controller, the chip further includes a first switch, and the first switch is connected to the first controller, the first interface, and the display.

The first controller is configured to: when determining that the display mode of the first electronic device includes the first display mode, control the first switch to connect a path between the display and the first interface, so that the display displays the display information of the second electronic device.

In a possible design, the first controller is specifically configured to: when determining, based on the first information, that the first electronic device is in at least one of a power-on state, a display screen-on state, and a first running mode, determine that the display mode of the first electronic device includes the first display mode, where the first running mode is a mode in which the first electronic device is configured to display information about an external device; and/or when determining, based on the second information, that the second electronic device is in at least one of a power-on state, a display screen-on state, and a third running mode, determine that the display mode of the first electronic device includes the first display mode, where the third running mode is a mode in which the second electronic device is configured, so that an external device performs displaying.

In a possible design, the at least one controller further includes a second controller, the first controller is connected to the first interface through the second controller, and the second controller is configured to determine, based on the device information of the second electronic device, whether the second electronic device is a video source; and the first controller is further configured to: receive a first instruction of the second controller, and when it is determined, according to the first instruction, that the second electronic device is the video source, determine that the display mode of the first electronic device includes the first display mode; or when it is determined, according to the first instruction, that the second electronic device is not the video source, determine that the display mode of the first electronic device includes the second display mode.

In a possible design, the second controller is specifically configured to: when it is determined, based on the device information of the second electronic device, that the second electronic device meets at least one of the following conditions: the second electronic device has a display, and a supported protocol is a source protocol, determine that the second electronic device is the video source.

In a possible design, the at least one controller further includes a third controller, and the first switch is connected to the display through the third controller; and the first controller is further configured to: when it is determined that the second electronic device is the video source, control the first switch to connect a path between the third controller and the first interface; and when the third controller determines, based on the first information and/or the second information, that at least one of the following cases is met, determine that the display mode of the first electronic device includes the first display mode, where the cases include:

an interface that is on the first electronic device and that is connected to the second electronic device is configured to be in a first state, where the first state is a state of inputting display information of an external device into the first electronic device;

an interface that is on the second electronic device and that is connected to the first electronic device is configured to be in a second state, where the second state is a state of outputting the display information of the second electronic device to an external device;

a signal loss rate generated during signal transmission between the first electronic device and the second electronic device is less than a threshold;

a format of the display information of the first electronic device matches that of the display information of the second electronic device; and software and/or hardware of the first electronic device match/matches software and/or hardware of the second electronic device.

In a possible design, the chip further includes a third switch, the third switch is connected to the first controller, an input device connection module, the first interface, and a main control chip of the first electronic device, and the input device connection module is configured to connect to an input device;

the first controller is configured to: when determining that the display mode of the first electronic device includes the first display mode, control the third switch to connect a path between the input device connection module and the first interface, so that the input device connection module sends an obtained input operation to the second electronic device through the first interface for response; and the first controller is configured to: when determining that the display mode of the first electronic device includes the second display mode, control the third switch to connect a path between the input device connection module and the main control chip, so that the input device connection module sends an obtained input operation to the main control chip for response.

In a possible design, the chip further includes a second switch, and the second switch is connected to the first interface, the main control chip, the first controller, and the input device connection module;

the first controller is configured to: when determining that the display mode of the first electronic device includes the first display mode, control the second switch to connect the path between the input device connection module and the first interface, so that the input device connection module sends the obtained input operation to the second electronic device through the first interface for response; and the first controller is configured to: when determining that the display mode of the first electronic device includes the second display mode, control the second switch to connect a path between the first interface and the main control chip, so that the main control chip reads, through the first interface, information stored in the second electronic device.

In a possible design, the first electronic device includes at least one interface configured to connect to the external device, and the first interface is any one of the at least one interface configured to connect to the external device.

In a possible design, when the first electronic device includes at least two interfaces configured to connect to the external device, the at least two interfaces are of a same interface type.

In a possible design, the at least two interfaces are all Type-C interfaces.

According to a third aspect, an electronic device is further provided, and includes:

an interface for connecting to an external device and a display; and the chip according to the second aspect.

According to a fourth aspect, an electronic device is further provided, and includes:

a processor, a memory, and one or more programs, where the one or more programs are stored in the memory, the one or more programs include instructions, and when the instructions are executed by the processor, the electronic device is enabled to perform steps of the method according to the first aspect.

According to a fifth aspect, a computer-readable storage medium is provided, where the computer-readable storage medium is configured to store a computer program; and when the computer program is run on a computer, the computer is enabled to perform the method according to the first aspect.

According to a sixth aspect, a computer program product is provided, and includes a computer program. When the computer program is run on a computer, the computer performs the method according to the first aspect.

For beneficial effects of the second aspect to the sixth aspect, refer to beneficial effects of the first aspect. Details are not described again.

DETAILED DESCRIPTION OF ILLUSTRATIVE EMBODIMENTS

With the development of the society, electronic products are becoming increasingly common, and in ordinary households, there are various electronic products, for example, a desktop computer, an all-in-one computer, a laptop computer, a tablet computer, and a mobile phone. Different electronic devices have different device forms, functions, and the like, to meet personalized requirements of people. The desktop computer is generally used with a monitor to meet requirements of people for office, gaming, and audio and visual entertainment. Generally, the desktop computer is equipped with a monitor, has a large size, and occupies a large area. The all-in-one computer integrates performance of the desktop computer and a large screen of the monitor, has a small size, and does not occupy large space as a conventional desktop computer equipped with a monitor, and therefore is popular among users.

Figure 1A:
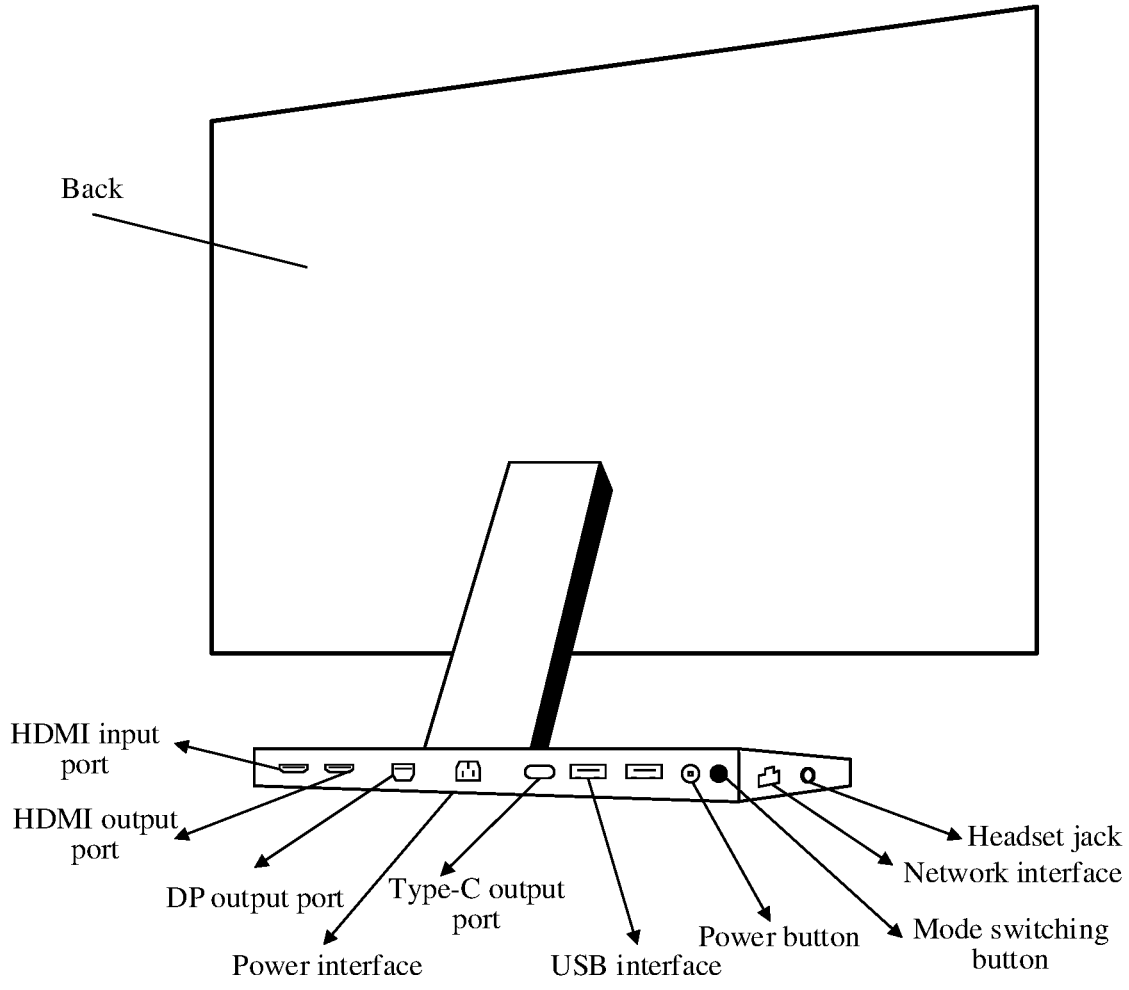
FIG. 1A and FIG. 1B are schematic diagrams of an all-in-one computer according to an embodiment of this application.
Figure 1B:
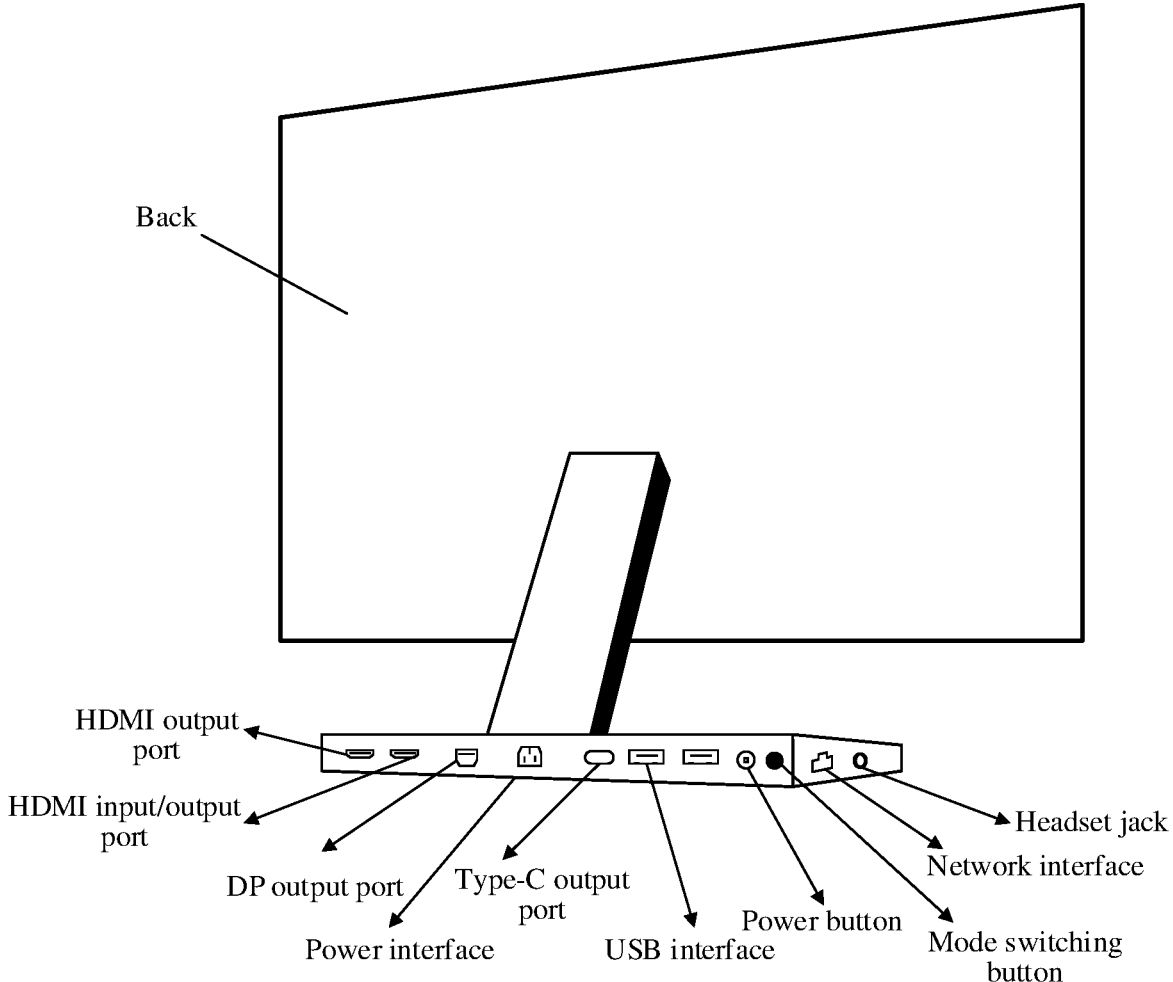

FIG. 1A and FIG. 1B are schematic diagrams of an all-in-one computer.

As shown in FIG. 1A, various interfaces and buttons are arranged on the all-in-one computer (for example, on the back of the all-in-one computer). For example, the interfaces include an HDMI input port, an HDMI output port, a display port (Display Port, DP) output port, a power interface, a Type-C interface, a universal serial bus (Universal Serial Bus, USB) interface, a headset jack, a network interface, and the like. The buttons include a power button, a mode switching button, and the like. Intuitively, deploying too many interfaces affects a concise design of an appearance of the all-in-one computer. In addition, if each interface is connected to a connection cable, connection cables are wrapped on a desktop, which affects user experience.

Different interfaces on the all-in-one computer correspond to different functions. The following uses the HDMI input port and the HDMI output port as an example. When the HDMI input port is connected to an external device, the all-in-one computer displays an interface of the external device. When the HDMI output port is connected to an external device, the all-in-one computer sends local display information to the external device for display. Therefore, when a user intends to display an interface of a laptop computer through the all-in-one computer, the laptop computer needs to be connected to the HDMI input port on the all-in-one computer, and cannot be connected to the HDMI output port. Therefore, the user needs to identify which one is the HDMI input port. Similarly, if the user intends to display a local interface of the all-in-one computer through the external device, the user needs to connect the external device to the HDMI output port on the all-in-one computer. Generally, form differences between different interfaces are not definite. Because a common user cannot easily distinguish a specific function of each interface, it is difficult for the user to find the HDMI input port or the HDMI output port by eyes. Some all-in-one computers are configured with specific identifiers to help the user distinguish between different interfaces. However, the user still needs to identify the interfaces by eyes, which affects user experience.

The all-in-one computer shown in FIG. 1B is an all-in-one computer designed to add an HDMI interface function. A difference from FIG. 1A lies in that: The HDMI input port and the HDMI output port in FIG. 1A are two separate interfaces. FIG. 1B includes two HDMI interfaces, where one is an HDMI output port, and the other is an HDMI input/output port. The HDMI input/output port may be understood as having both a function corresponding to the HDMI input port and a function corresponding to the HDMI output port. Therefore, FIG. 1B has two HDMI output ports. Certainly, if a quantity of HDMI input ports needs to be increased, the HDMI output port in FIG. 1B may also be designed as an HDMI input/output port. This type of all-in-one computer has added interface functions, but does not increase a quantity of interfaces. Therefore, such a design is good. However, there are still a large quantity of interfaces on the all-in-one computer in FIG. 1B. Therefore, when a user intends to display an interface of a laptop computer through the all-in-one computer, there is still a problem that the user needs to identify the HDMI input port from a plurality of interfaces.

The all-in-one computer (in FIG. 1A or FIG. 1B) has two working modes: a monitor mode and an all-in-one computer mode. The monitor mode means that the all-in-one computer displays a display interface of an external device. In this mode, the all-in-one computer is used as a monitor. In the all-in-one computer mode, the all-in-one computer displays a local display interface. Generally, the all-in-one computer is in the all-in-one computer mode by default. If the user intends to use the all-in-one computer as the monitor to display the display interface of the external device, the user can adjust the all-in-one computer to enter the monitor mode. For example, the user intends to display the interface of the laptop computer through the all-in-one computer, and the following two steps are specifically included:

1: The user finds the HDMI input port on the all-in-one computer, and wiredly connects the laptop computer to the HDMI input port.

2: The user finds a mode switching button on the all-in-one computer, and triggers the mode switching button, so that the all-in-one computer switches from the all-in-one computer mode to the monitor mode. For the mode switching button, refer to FIG. 1A or FIG. 1B.

In step 1 above, user experience is not good because the user needs to select the HDMI input port from the plurality of interfaces of the all-in-one computer. A common user cannot quickly and accurately find the interface. In step 2, the user also needs to find the mode switching button in the plurality of interfaces, and user experience is also not good.

An execution sequence of the foregoing two steps is not limited. For example, the user may first perform step 1 and then perform step 2, or first perform step 2 and then perform step 1.

For example, the user first performs step 2 and then performs step 1. Because the user first triggers the mode switching button, the all-in-one computer has entered the monitor mode. In this case, if the user has not performed step 1, that is, the laptop computer is not connected, the all-in-one computer displays a black screen. When step 2 is performed (the user connects the laptop computer to the HDMI input port on the all-in-one computer), the all-in-one computer switches from the black screen to displaying the interface of the laptop computer. However, if display information of the laptop computer cannot be normally displayed on the all-in-one computer, the all-in-one computer is also in a black screen state. Generally, when a screen of a display is black, the user may doubt whether the all-in-one computer is faulty, which brings poor user experience.

In addition, currently, when the user controls the all-in-one computer, an operation is generally performed through an input device such as a keyboard or a mouse connected to the all-in-one computer. When the all-in-one computer enters the monitor mode to display the display information of the laptop computer (the external device), the all-in-one computer does not respond to the input device such as the mouse or the keyboard connected to the all-in-one computer, and the user cannot control, through the input device such as the mouse or the keyboard connected to the all-in-one computer, the display information of the laptop computer displayed on the all-in-one computer. If the user intends to control the display information of the laptop computer on the all-in-one computer, the user can only perform an operation on the laptop computer to control update of the display information of the laptop computer, so as to update the display information of the laptop computer on the all-in-one computer. Consequently, the user still needs to perform an operation on a small-screen device (namely, the laptop computer), and experience is poor.

In summary, a current all-in-one computer has many defects: 1. Too many interfaces and buttons are deployed on the all-in-one computer, which affects an appearance. 2. A user needs to find specific interfaces (such as the HDMI input port and mode switching button) among a plurality of interfaces, which is difficult to perform. 3. When the user controls the all-in-one computer to enter the monitor mode by pressing the mode switching button, the all-in-one computer no longer displays local information. In this case, if the all-in-one computer is not connected to an external device or display information of the external device cannot be displayed normally, a screen of the all-in-one computer is black, which is not intelligent enough. 4. The user cannot control, through an input device such as a mouse or a keyboard connected to the all-in-one computer, the display information of the external device displayed on the all-in-one computer.

Embodiments of this application provide a display method. The method helps improve user experience generated when an all-in-one computer displays display information of an external device. Specifically, the method includes: When detecting that a first electronic device is connected to a second electronic device, the first electronic device determines a display mode of the first electronic device based on first information of the first electronic device and/or second information of the second electronic device. The display mode of the first electronic device includes a first display mode and a second display mode. The first display mode represents that the first electronic device displays display information of the second electronic device, and the second display mode represents that the first electronic device displays only local display information. If the first electronic device determines that the display mode of the first electronic device includes the first display mode, the first electronic device displays the display information of the second electronic device. If the first electronic device determines that the display mode of the first electronic device includes the second display mode, the first electronic device displays the local display information. For example, the first electronic device is an all-in-one computer. The all-in-one computer does not serve as a monitor to passively display display information of an external device, but determines, based on the first information of the all-in-one computer and/or the second information of the external device, to display local display information of the all-in-one computer or the display information of the external device.

Figure 2A:
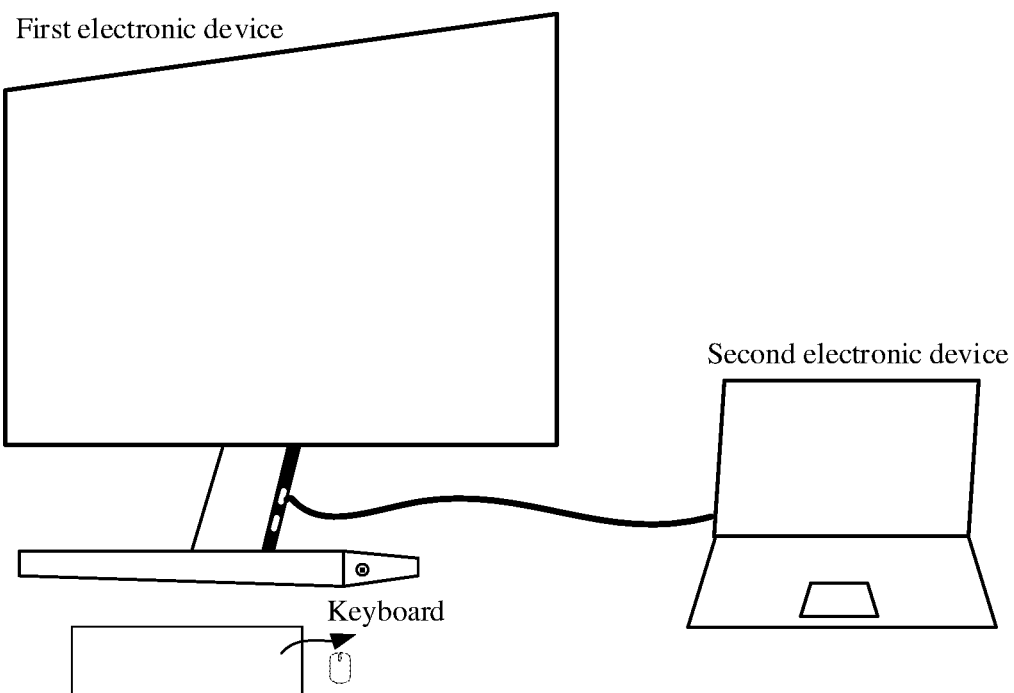
FIG. 2A and FIG. 2B are schematic diagrams of an application scenario according to an embodiment of this application.

The display method provided in embodiments of this application may be applied to a communication system shown in FIG. 2A.

As shown in FIG. 2A, the communication system includes a first electronic device and a second electronic device. The first electronic device may be connected to the second electronic device, and the connection may be a wired connection or a wireless connection. This is not limited in this application. In FIG. 2A, an example in which the first electronic device and the second electronic device are wiredly connected is used. However, technical solutions of this application may be applied to a case in which the first electronic device and the second electronic device are wirelessly connected. Both the first electronic device and the second electronic device may be devices having displays. For example, the first electronic device may be a large-screen device, and the second electronic device may be a small-screen device. For example, the first electronic device is, for example, a device having a large display, such as an all-in-one computer, a laptop computer, or a television, and the second electronic device may be a portable device having a small display, such as a laptop computer, a tablet computer, a watch, or a band. Certainly, specific types of the first electronic device and the second electronic device are not limited in embodiments of this application. The first electronic device and the second electronic device may be electronic devices of a same type or electronic devices of different types. In FIG. 2A, an example in which the first electronic device is an all-in-one computer and the second electronic device is a laptop computer is used. When detecting that the second electronic device is (wiredly or wirelessly) connected, the first electronic device may determine a display mode of the first electronic device (a specific process is described below). If the first electronic device determines that the display mode of the first electronic device includes a first display mode, display information of the second electronic device is displayed. If the first electronic device determines that the display mode of the first electronic device includes a second display mode, the first electronic device displays local information.

Figure 2B:
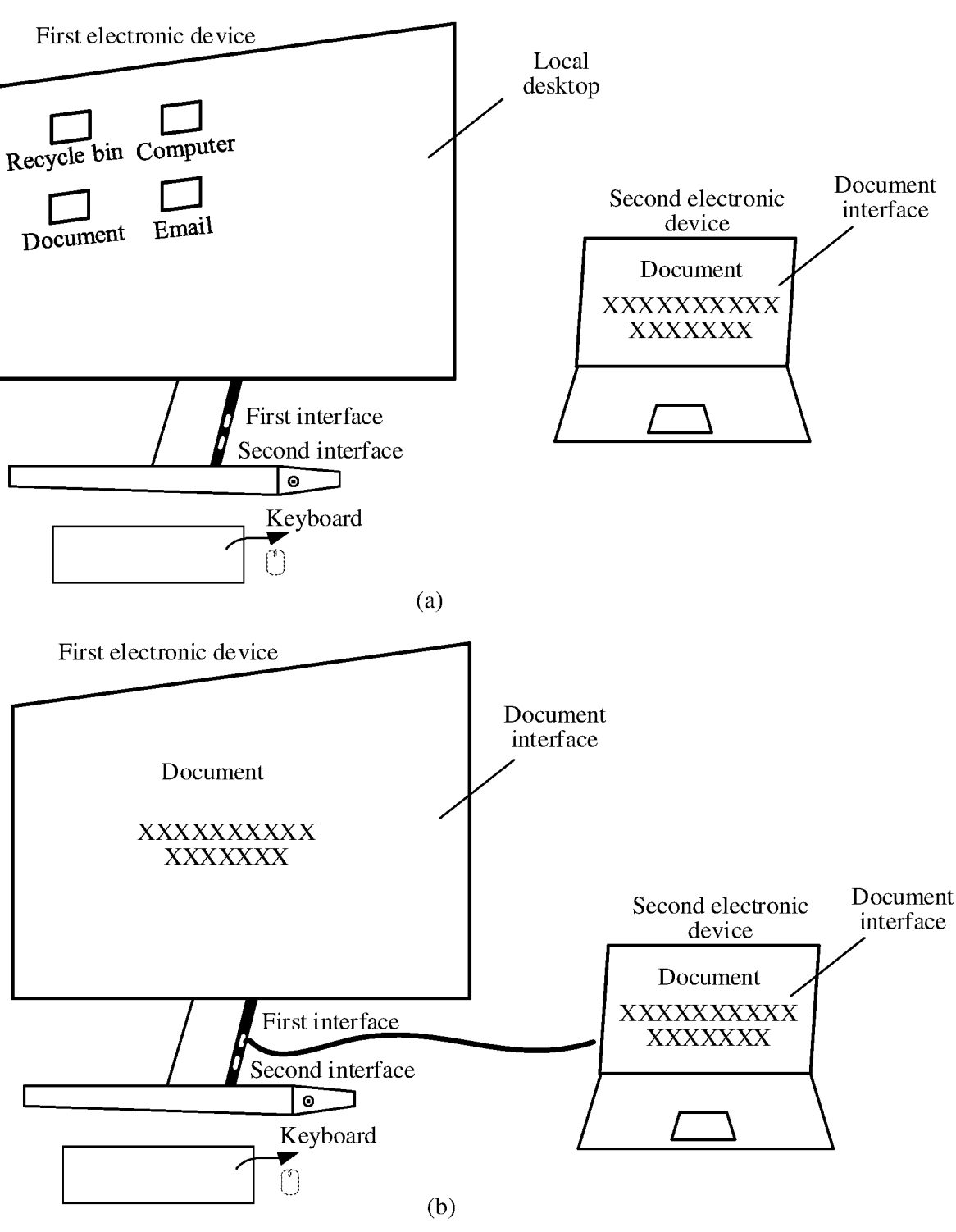

For example, FIG. 2B is a schematic diagram of an application scenario according to an embodiment of this application.

As shown in (a) in FIG. 2B, the first electronic device displays a local desktop (including various application icons such as a recycle bin and a computer). The second electronic device displays a document interface (for example, when a user works on the second electronic device). In this case, the first electronic device is not connected to the second electronic device. As shown in (b) in FIG. 2B, the user wiredly connects the first electronic device to the second electronic device. When detecting that the second electronic device is connected, the first electronic device determines a display mode based on first information of the first electronic device and/or second information of the second electronic device (which is described below). If a first display mode is determined, the first electronic device displays display information of the second electronic device, that is, the first electronic device displays the document interface of the second electronic device. It may be understood that a display of the first electronic device is greater than a display of the second electronic device, and therefore, an area of a document interface on the first electronic device may be greater than that of the document interface on the second electronic device, that is, the first electronic device displays an enlarged version of the document interface on the second electronic device. If a second display mode is determined, the first electronic device displays local display information.

For example, the first electronic device is an all-in-one computer. In embodiments of this application, the first electronic device has at least the following beneficial effects compared with the all-in-one computer in FIG. 1A or FIG. 1B.

For example, in embodiments of this application, a mode switching button (for example, the mode switching button in FIG. 1A or FIG. 1B) may not need to be provided on the first electronic device. In this application, the mode switching button is not needed for controlling the first electronic device to display the local information or information about the external device. When detecting that the second electronic device is connected, the first electronic device determines the display mode based on the first information of the first electronic device and/or the second information of the second electronic device; and if the first display mode is determined, displays the display information of the second electronic device; or if the second display mode is determined, displays the local display information. This manner is intelligent. Besides, compared with the all-in-one computer shown in FIG. 1A or FIG. 1B, the mode switching button does not need to be provided on the first electronic device, so that a quantity of interfaces is reduced, and an appearance is concise. In addition, a user does not need to find the mode switching button in a plurality of interfaces, and an operation is convenient and experience is good.

For another example, as described above, on the all-in-one computer shown in FIG. 1A or FIG. 1B, after the user controls, through the mode switching button, the all-in-one computer to enter the monitor mode, if the all-in-one computer is not connected to the external device or the display information of the external device cannot be normally displayed, the screen of the all-in-one computer is black. This application can avoid this case. The reason is as follows: The first electronic device determines the display mode based on the first information of the first electronic device and/or the second information of the second electronic device; and if the first display mode is determined, displays the display information of the second electronic device; or if the second display mode is determined, displays the local display information, so that a black screen does not occur. This is intelligent, and helps improve user experience.

For another example, the first electronic device is wiredly connected to the second electronic device. As shown in (b) in FIG. 2B, at least one interface is provided on the first electronic device, and the interface is configured to connect to an external device (in FIG. 2B, two interfaces, namely, a first interface and a second interface, are used as an example). When there are a plurality of interfaces, the first electronic device may monitor each interface to determine whether the external device is connected. When it is detected that any interface is connected to the external device (namely, the second electronic device), the display mode is determined based on the first information of the first electronic device and/or the second information of the external device. Therefore, when the plurality of interfaces configured to connect to the external device are provided on the first electronic device, if the user intends to use the first electronic device to display the display information of the second electronic device, the user may randomly select an interface, for wired connection, without a need to find a specific interface (for example, the HDMI input port in FIG. 1A or FIG. 1B), so that blind interface selection is implemented, and user operation difficulty is low, which helps improve user experience.

For another example, when the first electronic device displays the display information of the second electronic device, the first electronic device may receive an operation of an input device such as a keyboard or a mouse connected to the first electronic device, send information about the operation to the second electronic device for response, and then receive a response result of the second device for presentation (a specific implementation process is described below). The user does not need to perform an operation on the second electronic device, and experience is good.

Figure 3:
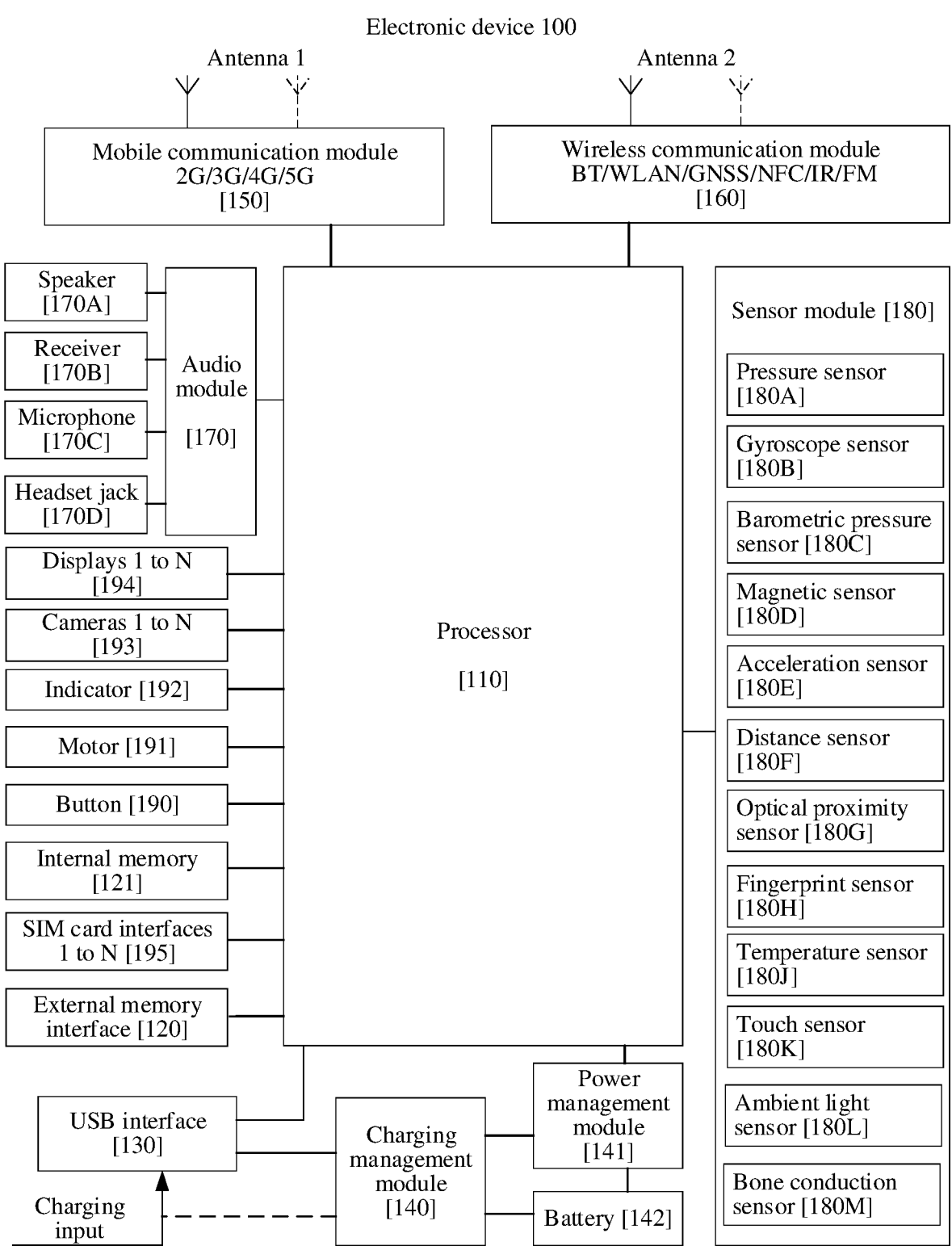
FIG. 3 is a schematic diagram of a structure of an electronic device according to an embodiment of this application.

FIG. 3 is a schematic diagram of a structure of an electronic device 100 according to an embodiment of this application. The electronic device 100 may be the first electronic device or the second electronic device in FIG. 2A. As shown in FIG. 3, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural network processing unit (neural network processing unit, NPU), and/or the like. Different processing units may be independent components, or may be integrated into one or more processors. The controller may be a nerve center and a command center of the electronic device 100. The controller may generate an operation control signal based on an instruction operation code and a time sequence signal, to complete control of instruction reading and instruction execution. A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device. The charging management module 140 is configured to receive charging input from the charger. The power management module 141 is configured to connect the battery 142, the charging management module 140, and the processor 110. The power management module 141 receives an input of the battery 142 and/or an input of the charging management module 140, and supplies power to the processor 110, the internal memory 121, an external memory, the display 194, the camera 193, the wireless communication module 160, and the like.

A wireless communication function of the electronic device 100 may be implemented through the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna in the electronic device 100 may be configured to cover one or more communication bands. Different antennas may be further reused, to improve antenna utilization. For example, the antenna 1 may be reused as a diversity antenna of a wireless local area network. In some other embodiments, the antenna may be used in combination with a tuning switch.

The mobile communication module 150 may provide a wireless communication solution that is applied to the electronic device 100 and that includes 2G/3G/4G/5G or the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules in the mobile communication module 150 may be disposed in the processor 110. In some embodiments, at least some function modules in the mobile communication module 150 may be disposed in a same component as at least some modules in the processor 110.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 are coupled, and the antenna 2 and the wireless communication module 160 are coupled, so that the electronic device 100 can communicate with a network and another device based on a wireless communication technology. The wireless communication technology may include a global system for mobile communication (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The display 194 is configured to display a display interface of an application, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element.

The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, software code of at least one application (for example, iQIYI or WeChat), and the like. The data storage area may store data (for example, an image or a video) generated in a process of using the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS).

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as pictures or videos are stored in the external storage card.

The electronic device 100 may implement an audio function, for example, music playing and recording, through the audio module 170, the speaker 170A, the receiver 170B, the microphone 170C, the headset jack 170D, the application processor, and the like.

The button 190 includes a power button, a volume button, and the like. The button 190 may be a mechanical button, or may be a touch button. The electronic device 100 may receive a button input, and generate a button signal input related to a user setting and function control of the electronic device 100. The motor 191 may generate a vibration prompt. The motor 191 may be configured to provide an incoming call vibration prompt, or may be configured to provide a touch vibration feedback. For example, touch operations performed on different applications (for example, photographing and audio playback) may correspond to different vibration feedback effects. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device 100.

It may be understood that the components shown in FIG. 3 do not constitute a specific limitation on the electronic device 100. The electronic device 100 in embodiments of the present invention may include more or fewer components than those in FIG. 3. In addition, a combination/connection relationship between the components in FIG. 3 may also be adjusted and modified.

The technical solutions provided in embodiments of this application are described below in detail with reference to the accompanying drawings.

Embodiment 1

Figure 4:
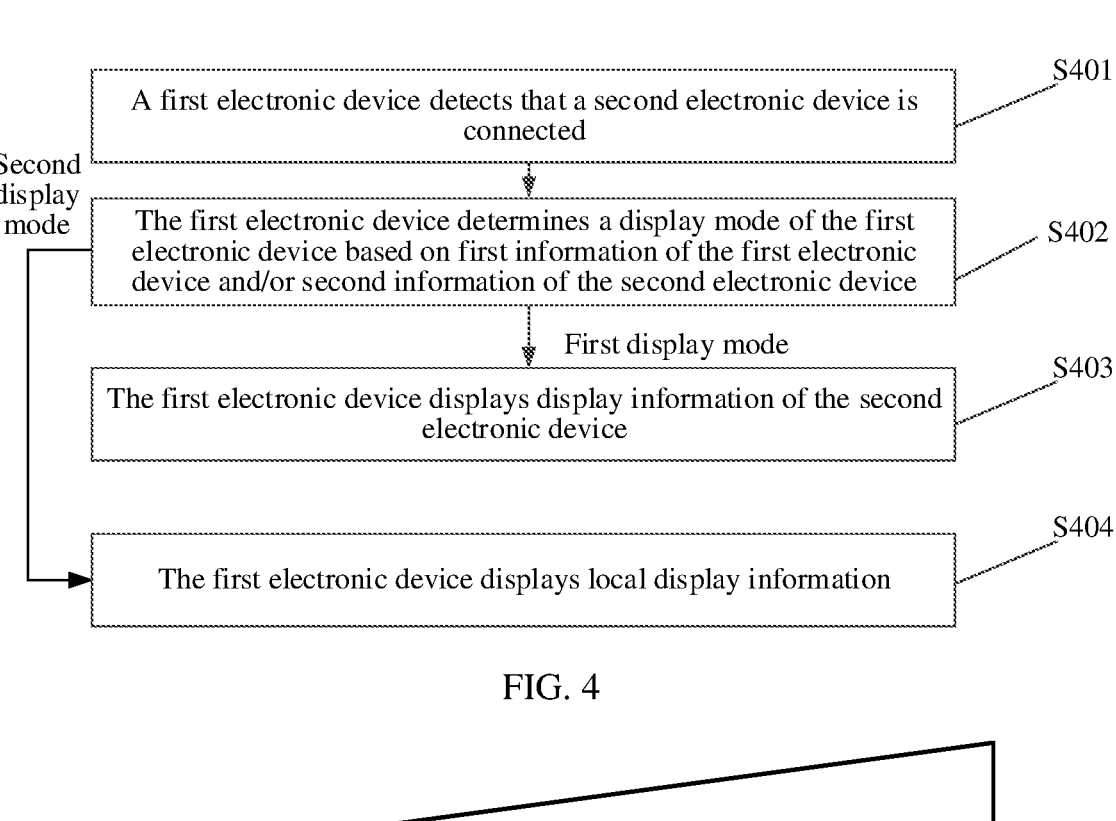
FIG. 4 is a schematic flowchart of a display method according to an embodiment of this application.

FIG. 4 is a schematic flowchart of a display method according to an embodiment of this application. The method may be applied to the first electronic device shown in FIG. 2A. As shown in FIG. 4, a procedure of the method includes the following steps.

S401: A first electronic device detects that a second electronic device is connected.

The connection may be a wired connection or a wireless connection. In an example of the wired connection, S401 may be that the first electronic device detects that a first interface is connected to the second electronic device. The first interface may be an interface that is on the first electronic device and that is configured to connect to an external device, such as an HIMI input port and a Type-C interface. If a plurality of interfaces configured to connect to an external device are provided on the first electronic device, the first interface may be any one of the plurality of interfaces. The plurality of interfaces may have a same function or type (for example, all interfaces are Type-C interfaces). Therefore, a user may blindly select an interface, which reduces use difficulty of the user, facilitates an operation, and experience is good.

S402: The first electronic device determines a display mode of the first electronic device based on first information of the first electronic device and/or second information of the second electronic device. The display mode of the first electronic device includes a first display mode and a second display mode. The first display mode means that the first electronic device displays display information of the second electronic device, and the second display mode means that the first electronic device displays only local display information.

Optionally, before S402, the method may further include a step: The first electronic device obtains the first information of the first electronic device. The first information includes running status information and/or device information of the first electronic device.

For example, the running status information of the first electronic device includes at least one of the following information:

a power-on state, a power-off state, a display status, a first running mode, a second running mode, and the like of the first electronic device, where the first running mode is a mode in which the first electronic device is configured to display information about an external device, the second running mode is a mode in which the first electronic device is configured to display the local information, and the display status may include a state such as a display screen-on state or a display black screen state.

For example, the device information of the first electronic device includes at least one of the following information:

a device form, a supported transmission protocol, a software system type, a software system version, a hardware version, a hardware type, a hardware parameter, and the like of the first electronic device, where the device form includes, for example, a laptop computer, an all-in-one computer, or a television set; the supported transmission protocols include a source protocol, a sink protocol, and the like; the software system includes an Android system, an iOS system, a HarmonyOS, and the like; the software system version includes Android system 2.0, iOS 1.0, and the like; the hardware type includes various hardware in the first electronic device, for example, a display and a transceiver; the hardware version indicates versions of various hardware in the first electronic device; and the hardware parameter indicates related parameters of various hardware in the first electronic device, where if the display of the first electronic device is used as an example, a hardware parameter of the display includes resolution, a supported video format, and the like; or if an interface of the first electronic device is used as an example, a hardware parameter of the interface includes interface configuration information, and the interface configuration information includes an interface type (a USB interface, an HDMI interface, a Type-C interface, or the like), an interface version (USB 2.0, USB 1.0, or the like), an interface status (a DP OUT state or a DP IN state), and the like.

Optionally, before S402, the method may further include a step: The first electronic device obtains the second information of the second electronic device. The second information includes running status information and/or device information of the second electronic device.

In some embodiments, when the second electronic device is connected to the first interface, the second electronic device may actively send configuration information to the first electronic device, where the configuration information includes the second information of the second electronic device. Alternatively, when detecting that the first interface is connected to the second electronic device, the first electronic device sends a query request to the second electronic device, to request to query configuration information of the second electronic device. After receiving the query request, the second electronic device returns the configuration information to the first electronic device, where the configuration information includes the second information of the second electronic device.

For example, the running status information of the second electronic device includes at least one of the following information:

a power-on state, a power-off state, a display status, a third running mode, and a fourth running mode of the second electronic device, where the third running mode is a mode in which the second electronic device is configured, so that an external device performs displaying, the fourth running mode is a mode in which the second electronic device is configured, so that displaying is performed locally, and the display status may include a state such as a display screen-on state or a display black screen state.

For example, the device information of the second electronic device includes at least one of the following information:

a device form, a supported transmission protocol, a software system type, a software system version, a hardware version, a hardware type, and a hardware parameter of the second electronic device, where the device form includes, for example, a wearable device, a laptop computer, a sound box, a power bank, and a USB flash drive; the supported transmission protocol includes a source protocol, a sink protocol, and the like; the software system includes an Android system, an iOS system, a HarmonyOS, and the like; the software system version includes Android system 2.0, iOS 1.0, and the like; the hardware type includes various hardware in the second electronic device, for example, a display and a transceiver; the hardware version indicates versions of various hardware in the second electronic device; and the hardware parameter indicates related parameters of various hardware in the second electronic device, where if the display of the second electronic device is used as an example, a hardware parameter of the display includes resolution, a supported video format, and the like; or if an interface of the second electronic device is used as an example, a hardware parameter of the interface includes interface configuration information, and the interface configuration information includes an interface type (a USB interface, an HDMI interface, a Type-C interface, or the like), an interface version (USB 2.0, USB 1.0, or the like), an interface status (a DP OUT state or a DP IN state), and the like.

Optionally, an implementation of S402 includes any one of the following Manner 1 to Manner 3.

Manner 1: The first electronic device determines, based on the device information of the second electronic device, whether the second electronic device is a video source. If the second electronic device is the video source, the first electronic device determines that the display mode of the first electronic device is the first display mode. If the second electronic device is not the video source, the first electronic device determines that the display mode of the first electronic device is the second display mode.

For example, the device information of the second electronic device includes the device form, the hardware type, and the like of the second electronic device. When the first electronic device determines, based on the device form and/or the hardware type, that the second electronic device has a display, the first electronic device determines that the second electronic device is the video source. For example, when the first electronic device determines, based on the device form of the second electronic device, that the second electronic device is a device with a display, such as a laptop computer or a tablet computer, the first electronic device determines that the second electronic device is the video source. For another example, when the first electronic device determines, based on the device form of the second electronic device, that the second electronic device is a device without a display, such as a sound box or a power bank, the first electronic device determines that the second electronic device is not the video source.

For example, the device information of the second electronic device includes the transmission protocol supported by the second electronic device. When the first electronic device determines, based on the device information of the second electronic device, that the second electronic device supports the source protocol, the first electronic device determines that the second electronic device is the video source.

That is, in Manner 1, when the first electronic device determines, based on the device information of the second electronic device, that the second electronic device meets at least one of the following conditions: the second electronic device has a display and the supported protocol is the source protocol, the first electronic device determines that the second electronic device is the video source.

Manner 2: When the first electronic device determines, based on the first information and/or the second information, that at least one of the following cases is met, the first electronic device determines that the display mode of the first electronic device is the first display mode; otherwise, the first electronic device determines that the display mode of the first electronic device is the second display mode.

The cases include at least one of the following cases.

1. An interface that is on the first electronic device and that is connected to the second electronic device is configured to be in a first state, and/or an interface that is on the second electronic device and that is connected to the first electronic device is configured to be in a second state. The first state indicates a state of inputting display information of an external device into the first electronic device. For example, the first state is the DP IN state. The second state indicates a mode of outputting the display information of the second electronic device to an external device. For example, the second state is the DP OUT state.

For example, the first information includes the device information of the first electronic device, and the device information may include the interface configuration information of the interface on the first electronic device. The second information includes the device information of the second electronic device, and the device information includes the interface configuration information of the interface on the second electronic device. The interface configuration information includes the interface type (a USB interface, an HDMI interface, a Type-C interface, or the like), the interface version (USB 2.0, USB 1.0, or the like), the interface status (the DP OUT state or the DP IN state), and the like. Therefore, when the first electronic device determines, based on the interface configuration information of the first electronic device, that the interface currently connected to the second electronic device is of a specific interface type (for example, an HDMI interface or a Type-C interface), and/or when the interface is in the first state, the first electronic device determines that the display mode of the first electronic device is the first display mode; and/or when the first electronic device determines, based on the interface configuration information of the second electronic device, that the interface that is on the second electronic device and that is currently connected to the first electronic device is of a specific interface type, and/or when the interface is in the second state, the first electronic device determines that the display mode of the first electronic device is the first display mode.

2. A signal transmission loss rate between the first electronic device and the second electronic device is less than a threshold.

For example, when the display information of the second electronic device is sent to the first electronic device through a connection cable, a signal loss is inevitably caused. If the signal loss is severe (for example, a signal transmission loss rate is high), the display information of the second electronic device received by the first electronic device is incomplete. For example, information of some bytes is lost. In this case, the first electronic device cannot normally display the display information of the second electronic device. Therefore, when the first electronic device determines, based on the device information of the second electronic device (the device information may include a signal transmission loss rate of the second electronic device), that the signal transmission loss rate between the first electronic device and the second electronic device is greater than the threshold, the first electronic device considers that the signal loss is severe, and determines that the display mode of the first electronic device is the second display mode. When the signal transmission loss rate between the first electronic device and the second electronic device is less than the threshold, the first electronic device considers that the signal loss is not severe, and determines that the display mode of the first electronic device is the first display mode. The signal transmission loss rate may be obtained in various manners. For example, the second electronic device stores the signal transmission loss rate by default (for example, a test person obtains the signal transmission loss rate through testing before the second electronic device is delivered from a factory); or the first electronic device may send a sounding signal to the second electronic device, then the second electronic device returns a sounding signal to the first electronic device, and the first electronic device may determine the signal transmission loss rate based on a loss between the sent sounding signal and the received sounding signal.

3. A format of the display information of the first electronic device matches that of the display information of the second electronic device.

For example, the device information of the first electronic device includes the hardware parameter of the first electronic device, and the hardware parameter includes a display information format (namely, a video format) supported by the display. The device information of the second electronic device includes the hardware parameter of the second electronic device, and the hardware parameter includes the video format supported by the display. The video format includes a video encoding/decoding format, for example, an audio video interleave (Audio Video Interleave, AVI) format, a moving picture experts group (Moving Picture Experts Group, MPEG) format, or a windows metafile (Windows Metafile, WMF) format. When determining, based on the hardware parameter of the first electronic device and the hardware parameter of the second electronic device, that the video formats supported by the displays of the first electronic device and the second electronic device match, the first electronic device determines that the display mode of the first electronic device is the first display mode. That the supported video formats match includes: The video format supported by the first electronic device is the same as the video format supported by the second electronic device.

4. Software and/or hardware of the first electronic device match/matches software and/or hardware of the second electronic device.

For example, the device information of the first electronic device includes the software system and/or the software system version of the first electronic device, and the device information of the second electronic device includes the software system and/or the software system version of the second electronic device. When determining, based on the device information of the first electronic device and the device information of the second electronic device, that the software system of the first electronic device matches the software system of the second electronic device, the first electronic device determines that the display mode of the first electronic device is the first display mode. That the software systems of the first electronic device and the second electronic device match includes: The software systems of the first electronic device and the second electronic device are the same or compatible (for example, both are Android systems or both are iOS systems), the software version of the first electronic device is equal to or higher than the software version of the second electronic device, or the like. This is not limited in embodiments of this application.

Manner 3: When the first electronic device determines, based on the running status information of the first electronic device, that the first electronic device is currently in a state in which the first electronic device can display display information of an external device, and/or when the first electronic device determines, based on the running status information of the second electronic device, that the second electronic device is currently in a state in which local information is displayed through an external device, the first electronic device determines that the display mode of the first electronic device is the first display mode; otherwise, the first electronic device determines that the display mode of the first electronic device is the second display mode.

That the first electronic device is in a state in which the first electronic device can display display information of an external device includes: The first electronic device is in at least one of the power-on state, the display screen-on state, and the first running mode. The first running mode is a mode in which the first electronic device is configured to display display information of an external device.

Optionally, the first electronic device has two running modes: the first running mode and the second running mode. The first running mode is a monitor mode, in other words, the first electronic device is configured to display information about an external device. The second running mode is an all-in-one computer mode, in other words, displays the local information of the first electronic device. Generally, the first electronic device is in the second running mode (namely, the all-in-one computer mode) by default. After detecting an instruction that instructs to enter the first running mode, the first electronic device switches from the second running mode to the first running mode. That the first electronic device detects an instruction that instructs the first electronic device to enter the first running mode may include at least one of the following:

a user input operation used to set the first electronic device to enter the first running mode is detected; or a voice instruction that instructs the first electronic device to enter the first running mode is detected; or when detecting that the second electronic device is connected, the first electronic device automatically enters the first running mode; or when detecting that the second electronic device is connected, the first electronic device pops up prompt information, where the prompt information is used to prompt a user to set the first running mode; or when detecting that the second electronic device is connected, the first electronic device determines whether the first electronic device is currently in the first running mode, and if the first electronic device is not in the first running mode, pops up prompt information to prompt a user to set the first running mode.

Figure 5:
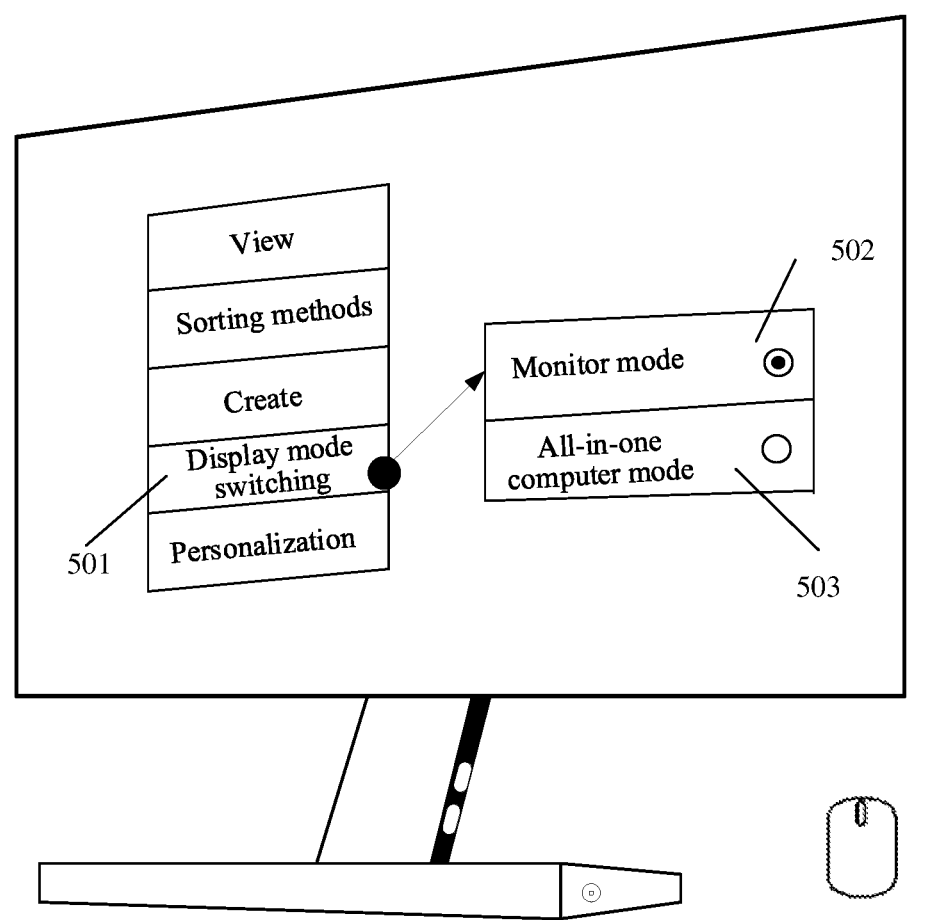
FIG. 5 and FIG. 6 are schematic diagrams of setting a first running mode on a first electronic device according to an embodiment of this application.

In an example, refer to FIG. 5. When detecting a first operation (for example, an operation of right-clicking a mouse when a mouse cursor is located on a desktop), the first electronic device displays a task list. The task list includes a "Display mode switching" option 501. When a second operation on the "Display mode switching" option 501 is detected, a "Monitor mode" option 502 and an "All-in-one computer mode" option 503 are displayed. When detecting a third operation of selecting the "Monitor mode" option 502 by a user, the first electronic device enters the first running mode, namely, the monitor mode.

Figure 6:
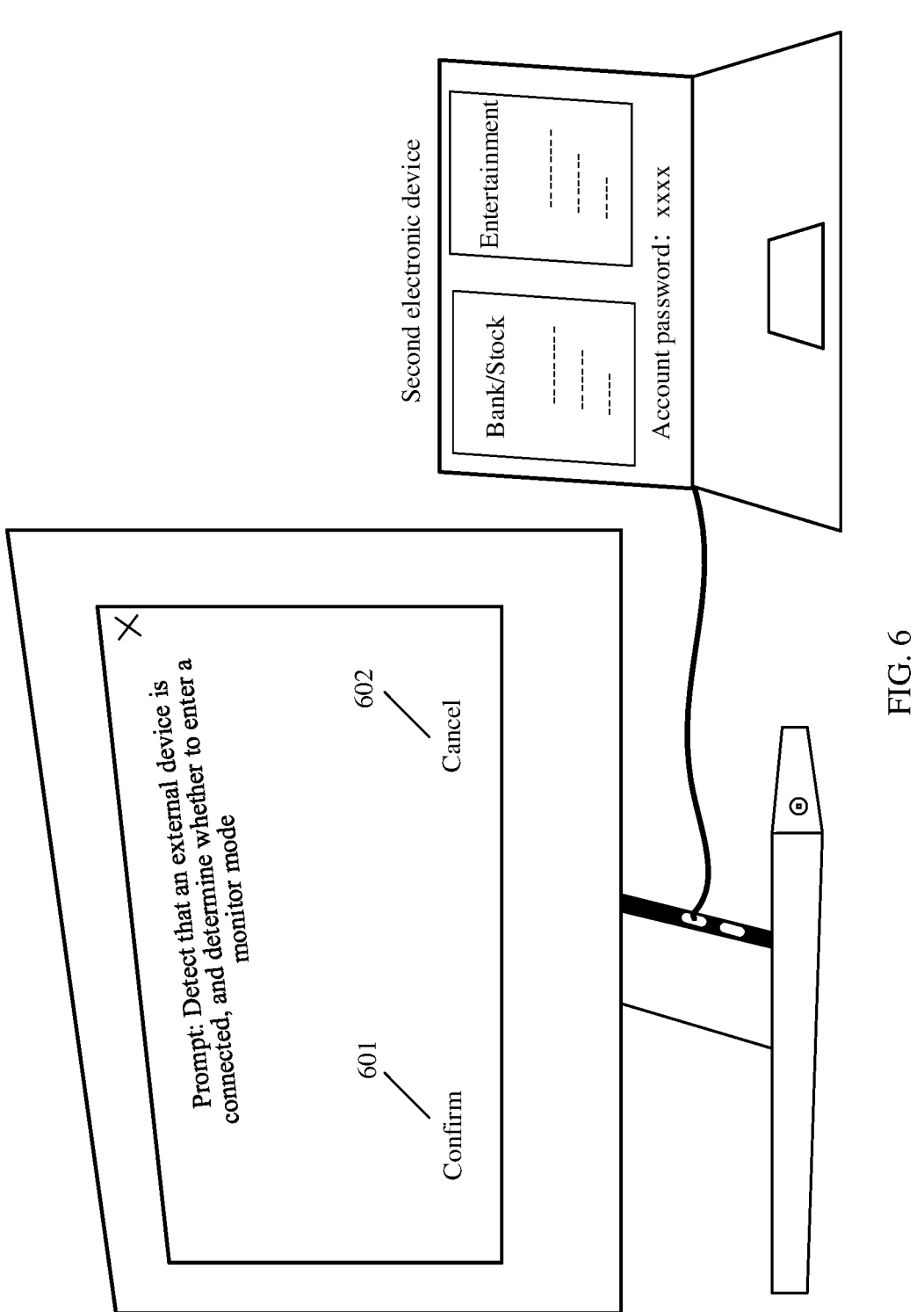

In another example, refer to FIG. 6. The first electronic device detects that the second electronic device is connected, and pops up prompt information, where the prompt information is used to prompt a user to set the first running mode. For example, the prompt information may be "Detect that an external device is connected, and determine whether to enter a monitor mode". The first electronic device may further display a "Conform" button 601 and a "Cancel" button 602. When an operation on the "Conform" button 601 is detected, the monitor mode (namely, the first running mode) is entered. When an operation on the "Cancel" button 602 is detected, the all-in-one computer mode (namely, the second running mode) is maintained.

The running status information of the first electronic device includes the power-on state or the power-off state of the first electronic device, the display screen-on state or the display black screen state of the first electronic device, and that the first electronic device is currently in the first running mode or the second running mode. Therefore, when the first electronic device determines, based on the running status information of the first electronic device, that the first electronic device is in at least one of the power-on state, the display screen-on state, and the first running mode, the first electronic device determines that the display mode of the first electronic device is the first display mode; otherwise, the first electronic device determines that the display mode of the first electronic device is the second display mode.

That the second electronic device is in a state in which local information is displayed through an external device includes: The second electronic device is in at least one of the power-on state, the display screen-on state, and the third running mode. The third running mode is a mode in which the second electronic device is configured, so that an external device displays local information.

Optionally, the second electronic device may have two running modes: the third running mode and a fourth running mode. The third running mode is a mode in which the second electronic device is configured, so that the external device displays the local information. The fourth running mode is a mode in which the second electronic device is configured to display the local information through a local display. Generally, the second electronic device is in the fourth running mode by default. After detecting an instruction that instructs to enter the third running mode, the second electronic device switches from the fourth running mode to the third running mode. That the second electronic device detects an instruction that instructs the second electronic device to enter the third running mode may include at least one of the following:

a user input operation used to set the second electronic device to enter the third running mode is detected; or
a voice instruction that instructs the second electronic device to enter the third running mode is detected; or
when detecting that the first electronic device is connected, the second electronic device automatically enters the third running mode; or
when it is detected that the first electronic device is connected, prompt information is popped up, where the prompt information is used to prompt a user to set the second electronic device to enter the third running mode; or
when detecting that the first electronic device is connected, the second electronic device determines whether the second electronic device is currently in the third running mode, and if the second electronic device is not in the third running mode, pops up prompt information to prompt a user to set the third running mode.

The running status information of the second electronic device includes the power-on state or the power-off state of the second electronic device, the display screen-on state or the display black screen state of the second electronic device, and that the second electronic device is currently in the third running mode or the fourth running mode. Therefore, when the first electronic device determines, based on the running status information of the second electronic device, that the second electronic device is in at least one of the power-on state, the display screen-on state, and the third running mode, the first electronic device determines that the display mode of the first electronic device is the first display mode; otherwise, the first electronic device determines that the display mode of the first electronic device is the second display mode.

Optionally, in the foregoing embodiment, an example in which S402 is performed by the first electronic device is used. It may be understood that S402 may alternatively be performed by the second electronic device. If S402 is performed by the second electronic device, the second electronic device may obtain the second information of the second electronic device and the first information of the first electronic device, determine the display mode of the first electronic device based on the first information and the second information, and notify the first electronic device of the determined display mode.

It should be noted that Manner 1 to Manner 3 may be used separately or in combination. An embodiment in which the three manners are combined is described in FIG. 10 below.

S403: If the first electronic device determines that the display mode of the first electronic device includes the first display mode, display the display information of the second electronic device.

Figure 7:
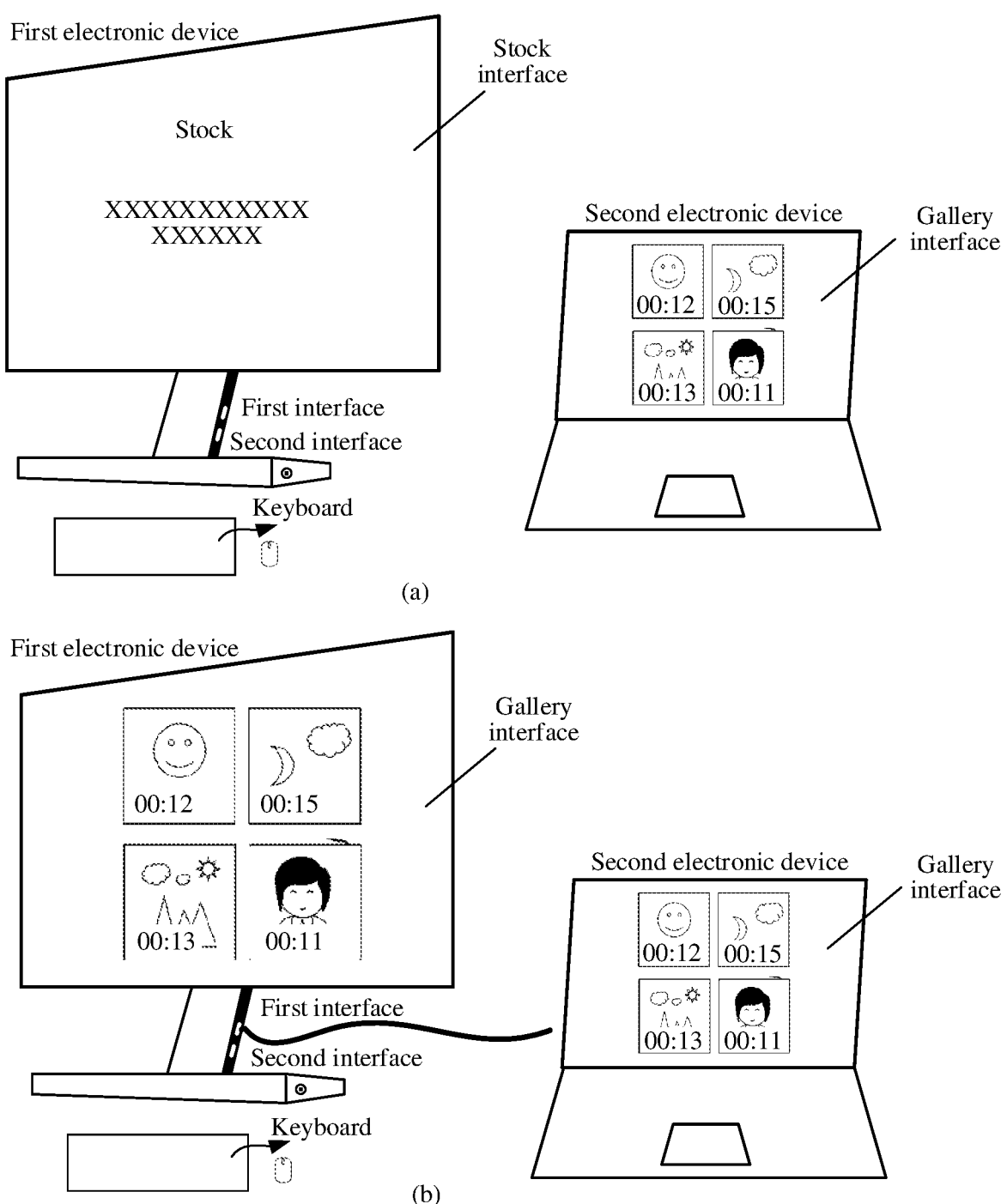
FIG. 7 is a schematic diagram in which a first electronic device displays display information of a second electronic device according to an embodiment of this application.

For example, refer to (a) in FIG. 7. A first electronic device displays a local interface of stocks, and a second electronic device displays a gallery application interface (a gallery interface for short). In this case, the first electronic device is not connected to the second electronic device. As shown in (b) in FIG. 7, when the first electronic device detects that a first interface is connected to the second electronic device and determines a first display mode based on first information of the first electronic device and/or second information of the second electronic device, the first electronic device displays display information of the second electronic device, that is, displays the gallery interface. It may be understood that a display size of the first electronic device is greater than that of the second electronic device, and therefore, an area of a gallery interface displayed on the first electronic device may be greater than or equal to an area of the gallery interface on the second electronic device, for example, in (b) in FIG. 7. Optionally, after the display information of the second electronic device is displayed by the first electronic device, a screen of the second electronic device may be black.

In some embodiments, the first electronic device may display the display information of the second electronic device in full screen; or the first electronic device performs split-screen display: displays the display information of the second electronic device in a first area, and displays the local information in a second area; or the display information of the second electronic device is located above the local display information of the first electronic device, and partially covers the local display information of the first electronic device. If the display information of the second electronic device partially covers the local display information of the first electronic device, a display location and/or a display area of the display information of the second electronic device may be adjusted based on a user operation.

S404: If the first electronic device determines that the display mode of the first electronic device includes the second display mode, display the local display information of the first electronic device.

In some embodiments, if the first electronic device determines that the display mode of the first electronic device includes the second display mode, the first electronic device may output prompt information to prompt the user that the display information of the second electronic device cannot be displayed. In this case, the first electronic device may continue to display the local information.

Figure 8:
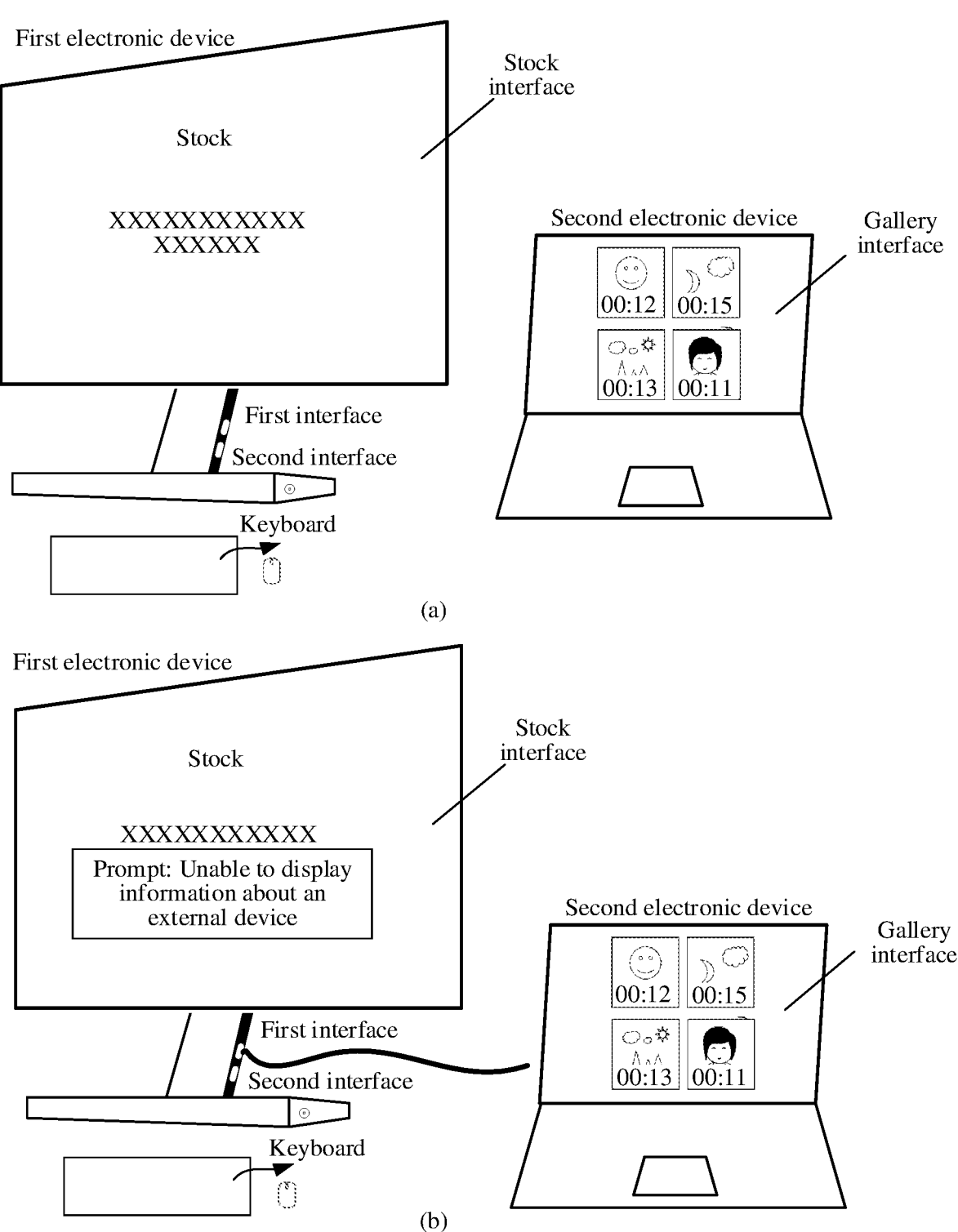
FIG. 8 is a schematic diagram in which a first electronic device cannot display display information of a second electronic device according to an embodiment of this application.

For example, refer to (a) in FIG. 8. A first electronic device displays a local interface of stocks, and a second electronic device displays a gallery application interface (a gallery interface for short). In this case, the first electronic device is not connected to the second electronic device. As shown in (b) in FIG. 8, when the first electronic device detects that a first interface is connected to the second electronic device and determines the second display mode based on the first information of the first electronic device and/or the second information of the second electronic device, the first electronic device displays prompt information (the prompt information may be displayed above the stock interface), to prompt the user that the display information of the second electronic device cannot be displayed. In this case, the first electronic device still displays the local information, namely, the stock interface.

In some embodiments, the first electronic device is connected to a third electronic device. The third electronic device may be an input device such as a mouse or a keyboard. When the first electronic device displays the display information of the second electronic device, the user may input an operation through the third electronic device. When receiving the input operation from the third electronic device, the first electronic device determines related information of the operation, and sends the related information to the second electronic device for response. The related information includes an operation type (for example, a tap operation), an operation location, and the like. Then, the first electronic device receives and displays a response result of the second electronic device.

Figure 9:
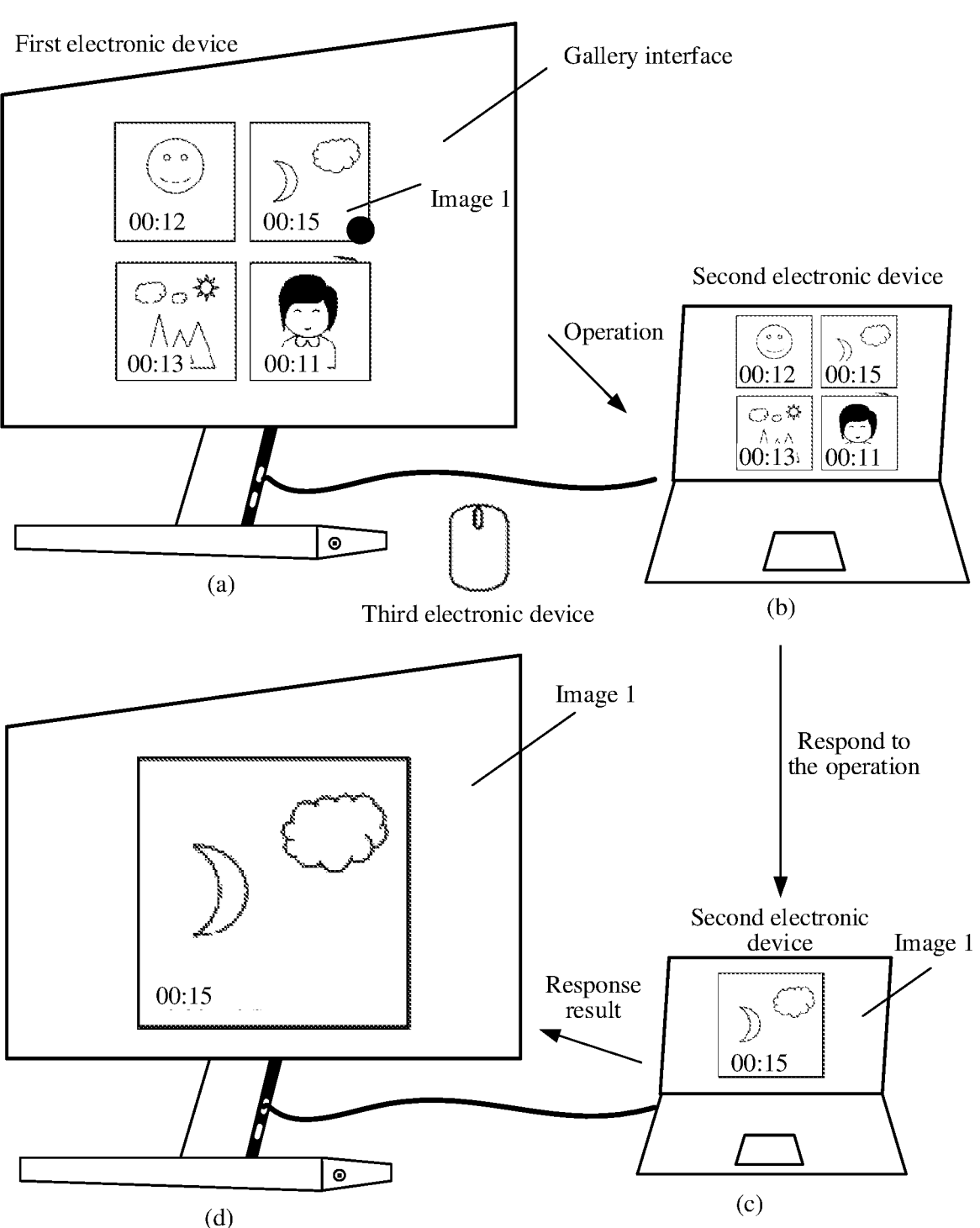
FIG. 9 is another schematic diagram in which a first electronic device displays display information of a second electronic device according to an embodiment of this application.

For example, refer to (a) in FIG. 9. A first electronic device displays display information, namely, a gallery interface, of a second electronic device. When detecting a tap operation input by a user, a third electronic device (for example, a mouse) sends the operation to the first electronic device. The first electronic device determines that a coordinate location corresponding to the operation is located on an image 1 on the gallery interface. In this case, the first electronic device sends related information (indicating that the operation is performed on the image 1, the tap operation, or the like) of the operation to the second electronic device. Refer to (b) in FIG. 9 and (c) in FIG. 9. After receiving the operation, the second electronic device responds to the operation, updates an interface of the second electronic device, that is, opens the image 1, and sends display information of the updated interface to the first electronic device for display. As shown in (d) in FIG. 9, the first electronic device displays the image 1.

Figure 10:
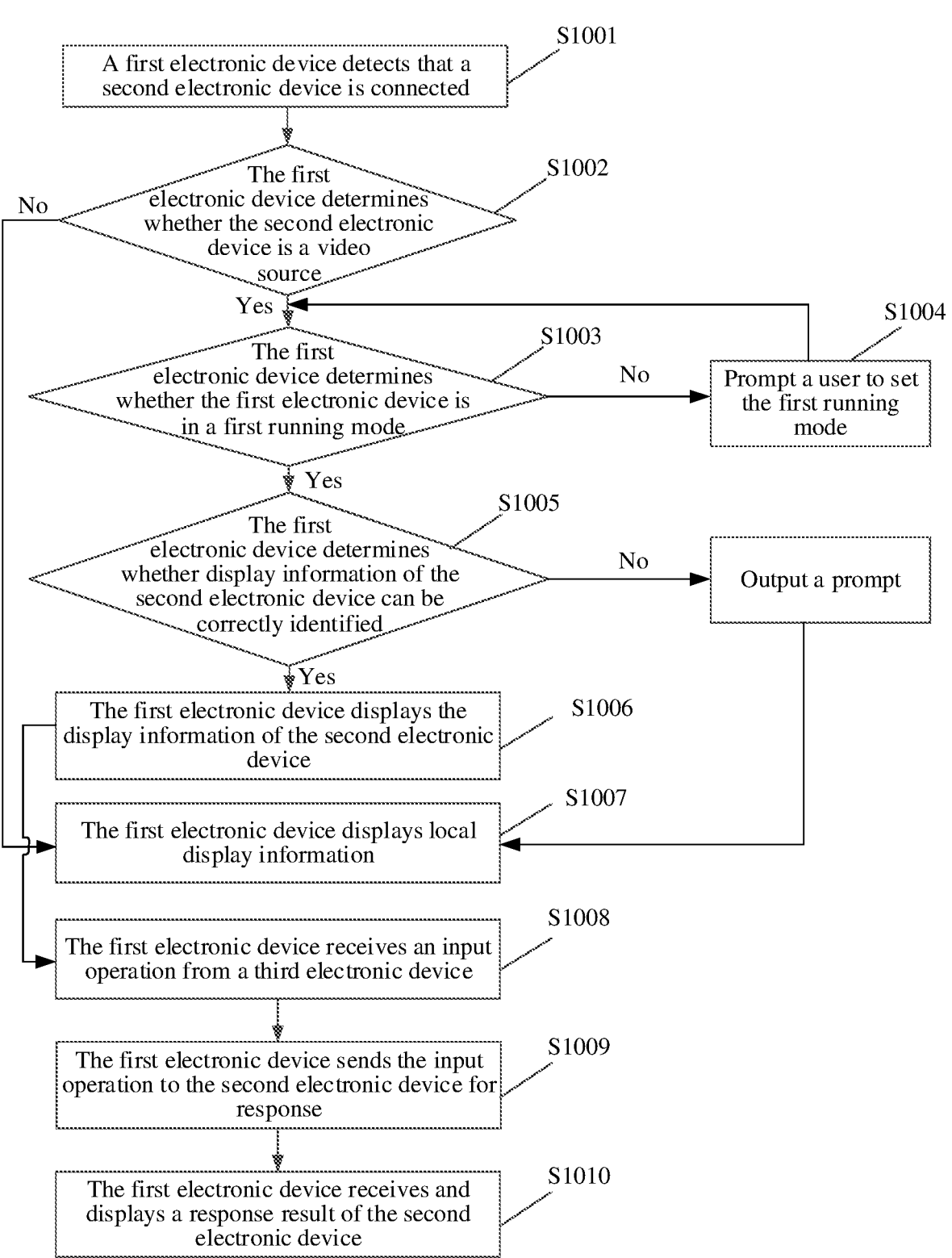
FIG. 10 is another schematic flowchart of a display method according to an embodiment of this application.

It should be noted that, in the foregoing embodiment, step 402 has three implementations: Manner 1 to Manner 3. An example of a combination of the three manners is used. FIG. 10 is another schematic flowchart of a display method according to an embodiment of this application. The method may be applied to a first electronic device. Specifically, such a procedure includes the following steps.

S1001: The first electronic device detects that a second electronic device is connected.

S1002: The first electronic device determines, based on device information of the second electronic device, whether the second electronic device is a video source; and if yes, performs S1003; otherwise, performs S1007. For a specific implementation principle of S1002, refer to Manner 1. Details are not described herein again.

S1003: The first electronic device determines, based on running status information, whether the first electronic device is in a first running mode; and if yes, performs S1005; otherwise, performs S1004. For descriptions of the first running mode, refer to Manner 3. Details are not described herein again.

S1004: The first electronic device outputs prompt information, to prompt a user to set the first running mode.

S1005: The first electronic device determines whether display information of the second electronic device can be correctly identified; and if yes, performs S1006; otherwise, outputs the prompt information. For example, the prompt information may prompt the user that the display information of the second electronic device cannot be identified or cannot be displayed. For a specific implementation principle of S1005, refer to Manner 2. For example, when it is determined that at least one of the following cases is met, it is determined that the display information of the second electronic device can be correctly identified. The cases include:

an interface that is on the first electronic device and that is connected to the second electronic device is configured to be in a first state, and/or an interface that is on the second electronic device and that is connected to the first electronic device is configured to be in a second state, where for descriptions of the first state and the second state, refer to Manner 2;

a signal transmission loss rate between the first electronic device and the second electronic device is less than a threshold;

a format of display information of the first electronic device matches that of the display information of the second electronic device; and software and/or hardware of the first electronic device match/matches software and/or hardware of the second electronic device.

S1006: The first electronic device displays the display information of the second electronic device.

S1007: The first electronic device displays local display information.

For specific examples of S1006 and S1007, refer to FIG. 7 or FIG. 8 mentioned above. Details are not described herein again.

S1008: The first electronic device receives an input operation from a third electronic device, where the third electronic device is an input device connected to the first electronic device. The input device includes a mouse, a keyboard, and the like.

S1009: The first electronic device sends the input operation to the second electronic device for response.

If the second electronic device updates the display information in response to the input operation, the updated display information of the second electronic device may be displayed through the first electronic device, that is, S1010.

S1010: The first electronic device receives and displays a response result of the second electronic device.

For implementation examples of S1008 to S1010, refer to FIG. 9. Details are not described herein again.

Embodiment 2

Figure 11:
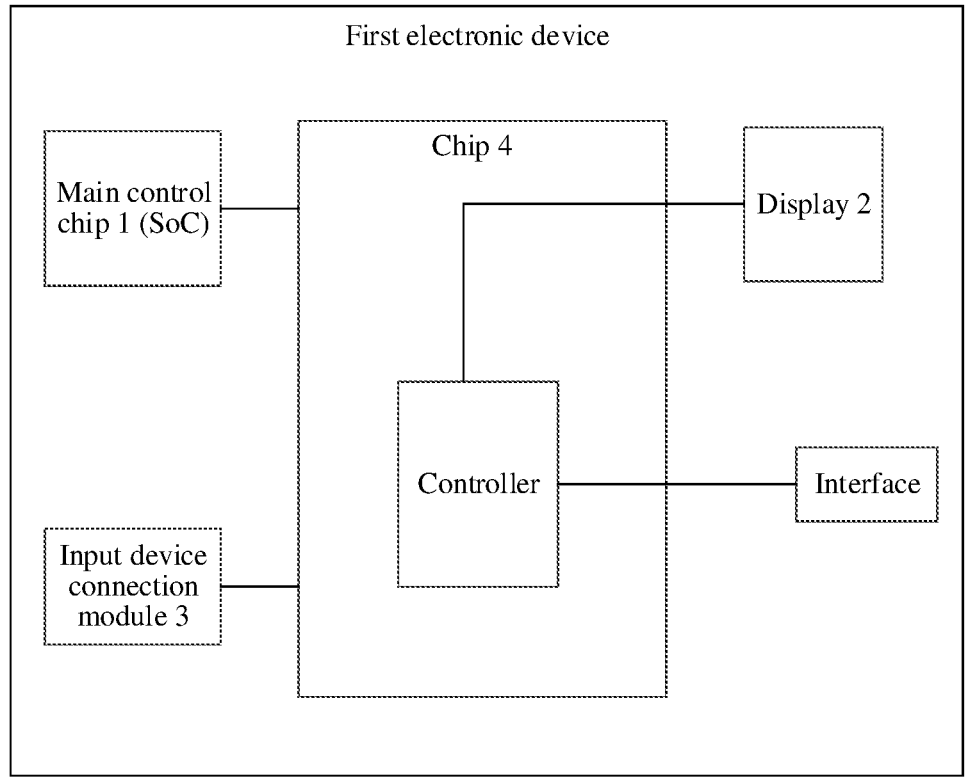
FIG. 11 to FIG. 13 are schematic diagrams of structures of electronic devices according to embodiments of this application.

Based on a same inventive concept, an embodiment of this application further provides a first electronic device. FIG. 11 is a schematic diagram of a structure of the first electronic device according to an embodiment of this application.

As shown in FIG. 11, the first electronic device includes a main control chip 1, a display 2, an input device connection module 3, and a chip 4. The chip 4 may be configured to implement the display method provided in Embodiment 1. For example, the main control chip 1 may be a system-on-a-chip (System-on-a-Chip, SoC), and is responsible for overall running of the first electronic device. The input device connection module 3 is configured to connect to an input device, where the input device may be a keyboard, a mouse, or the like. The display 2 is configured to display information.

The chip 4 may include: at least one interface, configured to connect to an external device (namely, a second electronic device); and further includes: at least one controller that is connected to the at least one interface and that is connected to the display 2. The at least one controller is configured to: determine a display mode of the first electronic device based on first information of the first electronic device and/or second information of the second electronic device; and when determining that the display mode of the first electronic device includes a first display mode, control the display 2 to display display information of the second electronic device; or when determining that the display mode of the first electronic device includes a second display mode, control the display 2 to display local display information of the first electronic device.

Figure 12:
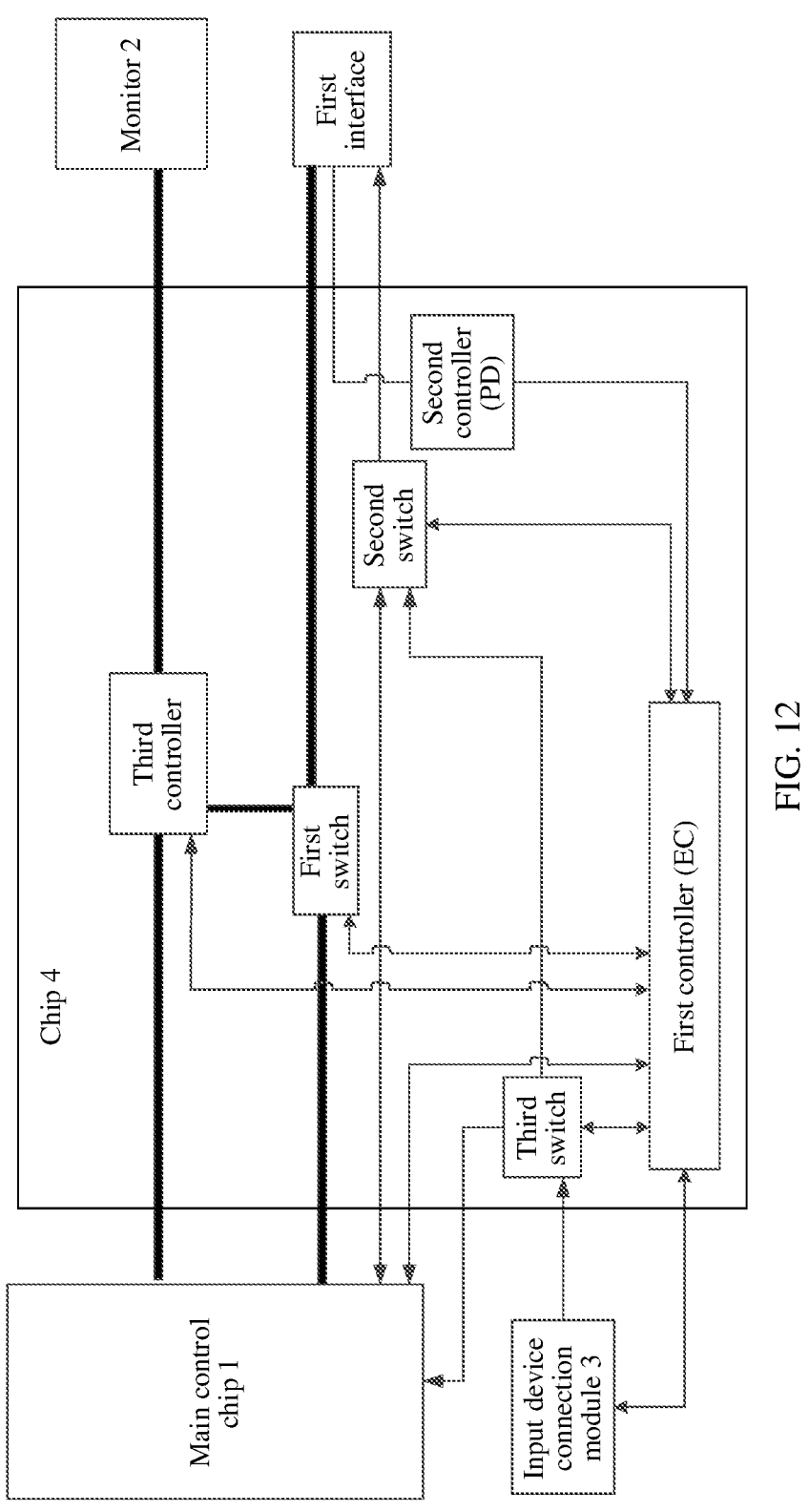

FIG. 12 is a detailed diagram of FIG. 11. Specifically, the chip 4 includes a first controller, a second controller, and a third controller, and further includes a first switch, a second switch, and a third switch. The first controller, the second controller, and the third controller may be one or more chips, an embedded controller (Embedded controller, EC), or the like. This is not limited in embodiments of this application.

A first interface is configured to connect to an external device, for example, the second electronic device. The first interface is connected to the second controller. The second controller may determine whether the external device connected to the first interface is a video source, and forwards a determining result to the first controller. For example, the second controller may be a PD.

The first switch is configured to connect the first interface, the main control chip, the first controller, and the third controller. Under control of the first controller, the first switch connects the first interface to the third controller or connects the first interface to the main control chip. For example, the first switch may be a 1:2 type multiplexer switch. This is not limited in embodiments of this application.

The second switch is configured to connect the first interface, the main control chip, the third switch, and the first controller. Under control of the first controller, the second switch may connect the first interface to the third switch or connect the first interface to the main control chip. For example, the second switch may be a 1:2 type multiplexer switch. This is not limited in embodiments of this application.

The third switch is connected to the input device connection module, the main control chip, the second switch, and the first controller. Under control of the first controller, the third switch connects the input device connection module to the main control chip or connects the input device connection module to the second switch. For example, the second switch may be a 1:2 type multiplexer switch. This is not limited in embodiments of this application.

The input device connection module is configured to connect to a third electronic device. The third electronic device may be an input device such as a mouse or a keyboard. For example, the input device connection module may be a Bluetooth module, configured to connect to a Bluetooth mouse or a Bluetooth keyboard based on a Bluetooth technology.

The first electronic device shown in FIG. 12 is used as an example to describe a processing process of the first electronic device. For example, the processing process includes the following steps.

Step 1: The second controller (for example, the PD) detects that the first interface is connected to the second electronic device.

Step 2: The second controller determines whether the second electronic device is a video source.

Step 3: When determining that the second electronic device is the video source, the second controller sends a first instruction to the first controller, where the first instruction instructs that the second electronic device is the video source. When determining that the second electronic device is not the video source (for example, the second electronic device is a sink device), the second controller may send a second instruction to the first controller, where the second instruction instructs that the second electronic device is not the video source. When receiving the second instruction, the first controller controls the first switch to connect the main control chip to the first interface, so that the main control chip sends, through the first interface, display information of the first electronic device to the second electronic device for display, that is, the first electronic device provides the display information for the external device for display. If the first controller receives the first instruction, perform step 4.

Step 4: The first controller determines whether the first electronic device is in a first running mode.

Step 5: When the first controller determines that the first electronic device is in the first running mode, the first controller sends a third instruction to the first switch, where the third instruction instructs the first switch to connect the third controller to the first interface. When determining that the first electronic device is not in the first running mode, the first controller controls, through the third controller, the display to display prompt information, to prompt a user to set the first running mode.

Step 6: After connecting the first interface, the third controller determines whether the first electronic device can correctly identify the display information of the second electronic device. For a specific implementation process, refer to S1005 in FIG. 10. If the third controller determines that the first electronic device cannot correctly identify the display information of the second electronic device, the third controller sends a fourth instruction to the first controller, where the fourth instruction instructs that the display information of the second electronic device cannot be identified. When receiving the fourth instruction, the first controller controls the second switch to connect the first interface to the main control chip, so that the main control chip reads stored information of the second electronic device through the first interface. If the third controller determines that the first electronic device can correctly identify the display information of the second electronic device, perform step 7.

Step 7: When determining that the first electronic device can correctly identify the display information of the second electronic device, the third controller uses the monitor to display the display information of the second electronic device, and returns a fifth instruction to the first controller, where the fifth instruction instructs the first controller to implement a mouse backhaul function (that is, step 8).

Step 8: The first controller controls the third switch to connect the input device connection module to the second switch, and controls the second switch to connect the third switch to the first interface. It should be noted that the third switch connects, by default, a path between the input device connection module and the main control chip, so that an input operation detected by an input device is sent to the main control chip for response. After receiving the fifth instruction, the first controller controls the third switch to connect to the first interface (through the second switch), so that the input operation detected by the input device is sent to the second electronic device through the first interface for response, that is, step 9.

Step 9: The input device connection module receives operation information of the third electronic device, and sends, through the third switch and the second switch, the operation information to the second electronic device through the first interface for response. The operation information includes a type (tap, double-tap, or the like) of the input operation, a location corresponding to the input operation, and the like.

Step 10: The first interface receives a response result of the second electronic device, and sends the response result to the third controller through the first switch, and the third controller controls the display to display the response result.

In FIG. 12, an example in which the first electronic device includes one interface (namely, the first interface) is used. It may be understood that the first electronic device may include a plurality of interfaces.

Figure 13:
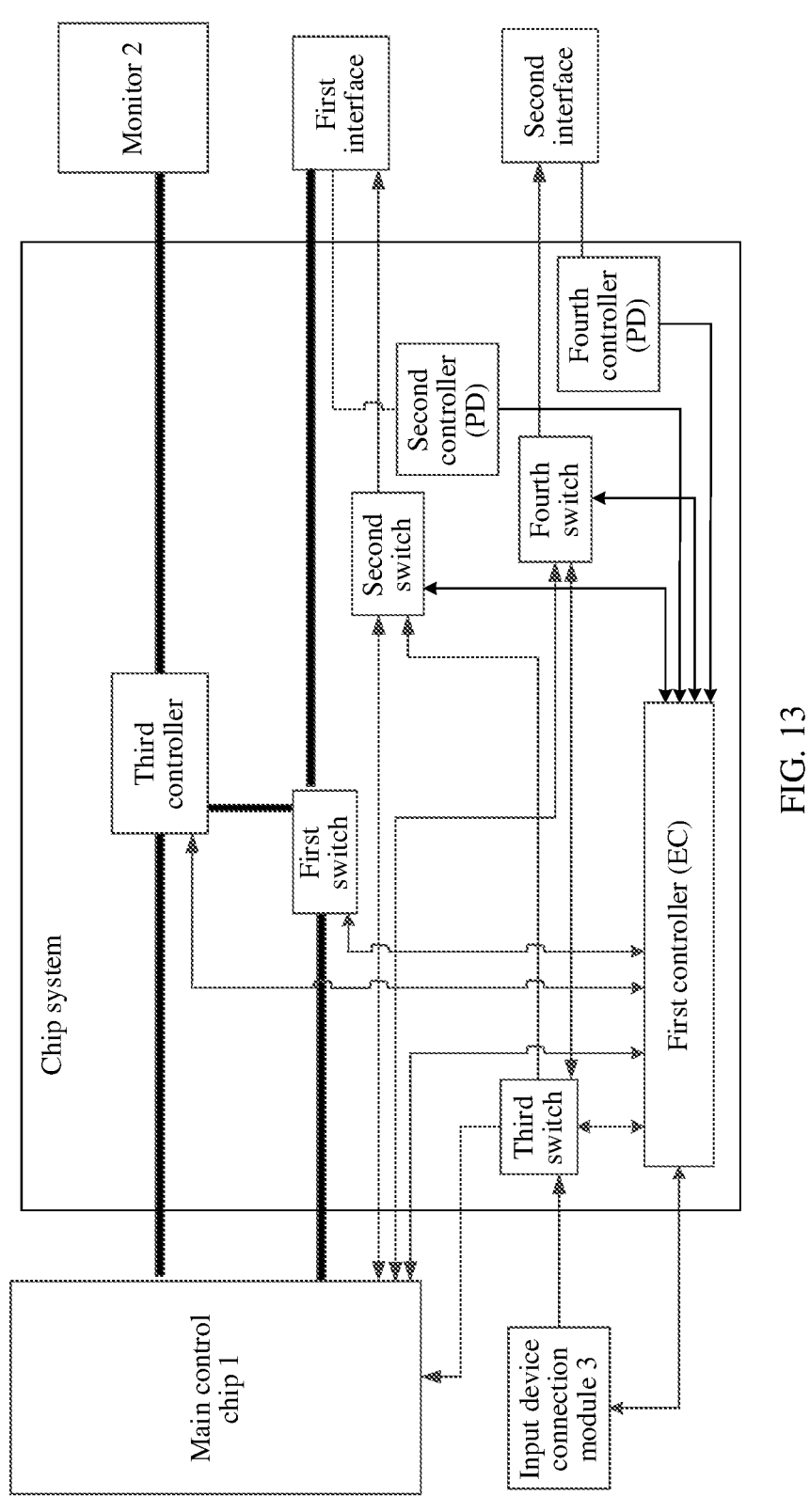

For example, refer to FIG. 13. A first electronic device includes two interfaces, namely, a first interface and a second interface. The second interface is connected to a fourth switch. Under control of a first controller, the fourth switch may connect the second interface to a third switch or connect the second interface to a SoC. For example, the fourth switch may be a 1:2 type multiplexer switch. The third switch may be a 1:3 type multiplexer switch.

After the first interface is connected to a second electronic device, the first electronic device displays display information of the second electronic device in the foregoing process of step 1 to step 10. When the second interface is connected to a fourth electronic device, the first electronic device may repeatedly perform the foregoing step 1 to step 10, so that the first electronic device displays display information of the fourth electronic device. It should be noted that, because the two interfaces are respectively connected to different external devices, the first electronic device may be used as a monitor to display information about the two external devices on split screens, or information about the later connected fourth electronic device may cover the display information about the first connected second electronic device, that is, the first electronic device displays only information about a latest connected external device.

For example, the first electronic device, as a monitor, may display information of two external devices on split screens. When receiving an operation that is input on a third electronic device (such as a mouse or a keyboard), an input device connection module may determine whether the input operation is for the second electronic device or the fourth electronic device, or send the operation to the first controller for determining. If the input operation is for the second electronic device, information about the operation is sent, through the third switch, the second switch, and the first interface, to the second electronic device for response; or if the input operation is for the fourth electronic device, information about the operation is sent, through the third switch, the fourth switch, and the second interface, to the fourth electronic device for response.

Figure 14:
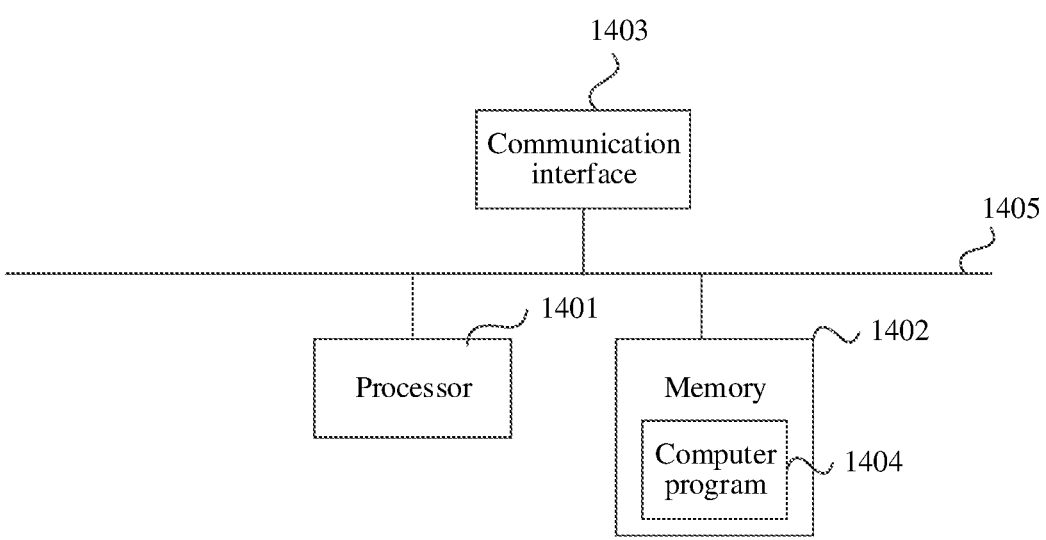
FIG. 14 is another schematic diagram of a structure of an electronic device according to an embodiment of this application.

Based on a same concept, FIG. 14 shows an electronic device 1400 according to this application. The electronic device 1400 may be the first electronic device or the second electronic device described above. As shown in FIG. 14, the electronic device 1400 may include one or more processors 1401, one or more memories 1402, a communication interface 1403, and one or more computer programs 1404. The foregoing components may be connected through one or more communication buses 1405. The one or more computer programs 1404 are stored in the memory 1402 and are configured to be executed by the one or more processors 1401. The one or more computer programs 1404 include instructions, and the instructions may be used to perform related steps of the first electronic device in the foregoing corresponding embodiment. The communication interface 1403 is configured to implement communication with another device. For example, the communication interface may be a transceiver.

In embodiments provided in this application, the method provided in embodiments of this application is described from the perspective in which an electronic device (for example, an all-in-one computer) is used as an execution body. To implement the functions in the method provided in the foregoing embodiments of this application, the electronic device may include a hardware structure and/or a software module, to implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

In embodiments of this application, "at least one" means one or more, and "a plurality of" means two or more. "And/or" is an association relationship for describing associated objects, and indicates that three relationships may exist. For example, A and/or B may indicate the following cases: Only A exists, both A and B exist, and only B exists, where A and B may be in a singular form or a plural form. The character "/" generally indicates an "or" relationship between the associated objects. At least one of the following items (pieces) or a similar expression thereof means any combination of these items, including any combination of singular items (pieces) or plural items (pieces). In addition, unless otherwise stated, ordinal numbers such as "first" and "second" in embodiments of this application are used to distinguish between a plurality of objects, and are not intended to limit sizes, content, an order, a time sequence, priorities, importance degrees, or the like of the plurality of objects.

Based on context, the term "when . . . " or "after . . . " used in the foregoing embodiments may be interpreted as a meaning of "if . . . ", "after . . . ", "in response to determining . . . ", or "in response to detecting . . . ". Similarly, based on the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)". In addition, in the foregoing embodiments, relationship terms such as first and second are used to distinguish one entity from another entity, but do not limit any actual relationship and sequence between these entities.

Reference to "an embodiment", "some embodiments", or the like described in this specification indicates that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and variants thereof all mean "include but are not limited to", unless otherwise specifically emphasized in another manner.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (solid-state drive, SSD)), or the like. When no conflict occurs, the solutions in the foregoing embodiments may be combined for use.

It should be noted that a part of this patent application document includes copyright-protected content. The copyright owner reserves the copyright except copies are made for the patent documents or the recorded content of the patent documents in the Patent Office.

What is claimed is:

1. A chip, used in a first electronic device, wherein the chip comprises at least one controller, wherein the at least one controller is configured to connect a display and a first interface that are of the first electronic device, wherein the first interface is configured to connect to a second electronic device;

wherein the at least one controller is configured to determine a display mode of the first electronic device based on first information of the first electronic device or second information of the second electronic device, wherein the display mode of the first electronic device comprises: a first display mode and a second display mode, in the first display mode the first electronic device displays display information of the second electronic device, and in the second display mode the first electronic device displays only local display information, and the first information comprises running status information of the first electronic device or device information of the first electronic device, and the second information comprises running status information of the second electronic device or device information of the second electronic device; and wherein the at least one controller is further configured to:
  when determining that the display mode of the first electronic device comprises the first display mode, control the display of the first electronic device to display the display information of the second electronic device;
wherein determining the display mode of the first electronic device based on the first information of the first electronic device or the second information of the second electronic device comprises:
  when determining, based on the device information of the second electronic device, that the second electronic device is a video source, determining that the display mode of the first electronic device comprises the first display mode;
wherein the at least one controller comprises a first controller, the chip further comprises a first switch, and the first switch is connected to the first controller, the first interface, and the display; and
wherein the first controller is configured to: when determining that the display mode of the first electronic device comprises the first display mode, control the first switch to connect a path between the display and the first interface, so that the display displays the display information of the second electronic device.

2. The chip according to claim 1, wherein the at least one controller is further configured to: when determining that the display mode of the first electronic device comprises the second display mode, control the display of the first electronic device to display the display information of the first electronic device.

3. The chip according to claim 1, wherein the first controller is configured to:
  when determining, based on the first information, that the first electronic device is in at least one of a power-on state, a display screen-on state, or a first running mode, determine that the display mode of the first electronic device comprises the first display mode, wherein in the first running mode the first electronic device is configured to display display information of an external device.

4. The chip according to claim 1, wherein the at least one controller further comprises a second controller, the first controller is connected to the first interface through the second controller, and the second controller is configured to determine, based on the device information of the second electronic device, whether the second electronic device is a video source; and
  wherein the first controller is further configured to:
    receive a first instruction of the second controller; and
    when it is determined, according to the first instruction, that the second electronic device is the video source, determine that the display mode of the first electronic device comprises the first display mode; or when it is determined, according to the first instruction, that the second electronic device is not the video source, determine that the display mode of the first electronic device comprises the second display mode.

5. The chip according to claim 4, wherein the at least one controller further comprises a third controller, and the first switch is connected to the display through the third controller; and
  wherein the first controller is further configured to: when it is determined that the second electronic device is the video source, control the first switch to connect a path between the third controller and the first interface; and when the third controller determines, based on the first information or the second information, that at least one of the following cases is met, determine that the display mode of the first electronic device comprises the first display mode, wherein the cases comprise:

an interface that is on the first electronic device and that is connected to the second electronic device is configured to be in a first state, wherein the first state is a state of inputting display information of an external device into the first electronic device;

an interface that is on the second electronic device and that is connected to the first electronic device is configured to be in a second state, wherein the second state is a state of outputting the display information of the second electronic device to an external device;

a signal loss rate generated during signal transmission between the first electronic device and the second electronic device is less than a threshold;

a format of the display information of the first electronic device matches that of the display information of the second electronic device; and software or hardware of the first electronic device match/ matches software or hardware of the second electronic device.

6. The chip according to claim 1, wherein in the first display mode:

the display information of the second electronic device is located at an upper layer of the display information of the first electronic device, and partially covers the display information of the first electronic device.

7. The chip according to claim 1, wherein the first controller is configured to:

when determining, based on the second information, that the second electronic device is in at least one of a power-on state, a display screen-on state, or a third running mode, determine that the display mode of the first electronic device comprises the first display mode, wherein in the third running mode an external device displays the display information of the second electronic device.

8. A method, applied to a first electronic device, comprising:

determining, by at least one controller of the first electronic device, a display mode of the first electronic device based on first information of the first electronic device or second information of a second electronic device, wherein the display mode of the first electronic device comprises: a first display mode and a second display mode, in the first display mode the first electronic device displays display information of the second electronic device, and in the second display mode the first electronic device displays only local display information, and the first information comprises running status information of the first electronic device or device information of the first electronic device, and the second information comprises running status information of the second electronic device or device information of the second electronic device, and wherein a first interface of the first electronic device is configured to connect to the second electronic device; and when determining, by the at least one controller, that the display mode of the first electronic device comprises the first display mode, controlling the display of the first electronic device to display the display information of the second electronic device;

wherein determining, by the at least one controller, the display mode of the first electronic device based on the first information of the first electronic device or the second information of the second electronic device comprises:

when determining, based on the device information of the second electronic device, that the second electronic device is a video source, determining that the display mode of the first electronic device comprises the first display mode;

wherein the at least one controller comprises a first controller, a first switch is connected to the first controller, the first interface, and the display; and wherein controlling the display of the first electronic device to display the display information of the second electronic device comprises:

when determining that the display mode of the first electronic device comprises the first display mode, controlling the first switch to connect a path between the display and the first interface, so that the display displays the display information of the second electronic device.

9. The method according to claim 8, further comprising:

when determining that the display mode of the first electronic device comprises the second display mode, controlling the display of the first electronic device to display the display information of the first electronic device.

10. The method according to claim 8, wherein determining, by the at least one controller of the first electronic device, the display mode of the first electronic device based on the first information of the first electronic device or the second information of the second electronic device comprises:

determining, based on the first information, that the first electronic device is in at least one of a power-on state, a display screen-on state, or a first running mode; and determining that the display mode of the first electronic device comprises the first display mode, wherein in the first running mode the first electronic device is configured to display display information of an external device.

11. The method according to claim 8, wherein the at least one controller further comprises a second controller, the first controller is connected to the first interface through the second controller, and the second controller determines, based on the device information of the second electronic device, whether the second electronic device is a video source; and wherein the method further comprises:

receiving a first instruction of the second controller; and when it is determined, according to the first instruction, that the second electronic device is the video source, determining that the display mode of the first electronic device comprises the first display mode; or when it is determined, according to the first instruction, that the second electronic device is not the video source, determining that the display mode of the first electronic device comprises the second display mode.

12. The method according to claim 8, wherein the at least one controller further comprises a third controller, and the first switch is connected to the display through the third controller; and wherein the method further comprises:

when it is determined that the second electronic device is the video source, controlling the first switch to connect a path between the third controller and the first interface; and when the third controller determines, based on the first information or the second information, that at least one of the following cases is met, determining that the display mode of the first electronic device comprises the first display mode, wherein the cases comprise:

an interface that is on the first electronic device and that is connected to the second electronic device is configured to be in a first state, wherein the first state is a state of inputting display information of an external device into the first electronic device;

an interface that is on the second electronic device and that is connected to the first electronic device is configured to be in a second state, wherein the second state is a state of outputting the display information of the second electronic device to an external device;

a signal loss rate generated during signal transmission between the first electronic device and the second electronic device is less than a threshold;

a format of the display information of the first electronic device matches that of the display information of the second electronic device; and software or hardware of the first electronic device match/matches software or hardware of the second electronic device.

13. The method according to claim 8, wherein in the first display mode:

the display information of the second electronic device is located at an upper layer of the display information of the first electronic device, and partially covers the display information of the first electronic device.

14. The method according to claim 8, further comprising:

when determining, based on the second information, that the second electronic device is in at least one of a power-on state, a display screen-on state, or a third running mode, determining that the display mode of the first electronic device comprises the first display mode, wherein in the third running mode an external device displays the display information of the second electronic device.

15. A first electronic device comprising:

a main control chip;

a first controller, a second controller, a third controller, a first switch, a second switch, and a third switch; and a first interface, connected to the second controller and configured to connect to a second electronic device;

wherein the first switch is connected the first interface, the main control chip, the first controller, and the third controller, and configured to:

under control of the first controller, connect the first interface to the third controller or connect the first interface to the main control chip;

wherein the second switch is connected to the first interface, the main control chip, the third switch, and the first controller, and configured to:

under control of the first controller, connect the first interface to the third switch, or connect the first interface to the main control chip;

wherein the third switch is connected to the main control chip, the second switch and the first controller, and configured to:

under control of the first controller, connect an input device connection module to the main control chip, or connect the input device connection module to the second switch;

wherein the second controller is configured to:

determine, based on device information of the second electronic device, whether the second electronic device connected to the first interface is a video source, and forward a determining result to the first controller;

wherein the first controller is configured to:

when the determining result indicates that the second electronic device is not the video source, control the first switch to connect the main control chip to the first interface, so that the main control chip sends, through the first interface, display information of the first electronic device to the second electronic device for display;

when the determining result indicates that the second electronic device is the video source, determine whether the first electronic device is in a first running mode, and send an instruction to the first switch, where the instruction instructs the first switch to connect the third controller to the first interface; and wherein the third controller is configured to:

uses a monitor of the first electronic device to display the display information of the second electronic device.

16. The first electronic device according to claim 15, wherein the first switch is a multiplexer switch.

17. The first electronic device according to claim 15, wherein the second switch is a multiplexer switch.

18. The first electronic device according to claim 15, wherein the third controller is further configured to:

determine whether the first electronic device is able to correctly identify the display information of the second electronic device.

19. The first electronic device according to claim 18, wherein the third controller is further configured to:

in response to determining that the first electronic device cannot correctly identify the display information of the second electronic device, send a second instruction to the first controller, where the second instruction instructs that the display information of the second electronic device cannot be identified.

20. The first electronic device according to claim 19, wherein the first controller is further configured to:

in response to receiving the second instruction, control the second switch to connect the first interface to the main control chip, so that the main control chip reads stored information of the second electronic device through the first interface.

* * * * *